(12) United States Patent
Nam et al.

(10) Patent No.: US 11,356,948 B2
(45) Date of Patent: Jun. 7, 2022

(54) DISCONTINUOUS RECEPTION WAKE-UP PROCEDURE WITH FAST BEAM MANAGEMENT

(71) Applicant: QUALCOMM Incorporated, San Diego, CA (US)

(72) Inventors: Wooseok Nam, San Diego, CA (US); Tao Luo, San Diego, CA (US); Peter Pui Lok Ang, San Diego, CA (US); Linhai He, San Diego, CA (US); Gabi Sarkis, San Diego, CA (US); Olufunmilola Omolade Awoniyi-Oteri, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/899,311

(22) Filed: Jun. 11, 2020

(65) Prior Publication Data
US 2020/0396685 A1     Dec. 17, 2020

Related U.S. Application Data

(60) Provisional application No. 62/861,950, filed on Jun. 14, 2019.

(51) Int. Cl.
*H04W 52/02* (2009.01)
*H04W 76/28* (2018.01)
(Continued)

(52) U.S. Cl.
CPC ........ *H04W 52/0229* (2013.01); *H04B 7/088* (2013.01); *H04W 16/28* (2013.01);
(Continued)

(58) Field of Classification Search
CPC ............. H04W 52/0229; H04W 76/28; H04W 52/0245; H04W 72/042; H04W 72/046; H04W 16/28; H04B 7/088
See application file for complete search history.

(56) References Cited

U.S. PATENT DOCUMENTS

2019/0059129 A1*   2/2019   Luo .................... H04W 72/042

OTHER PUBLICATIONS

Qualcomm Incorporated: "Potential Techniques for UE Power Saving", 3GPP Draft; RI-1903016, 3rd Generation Partnership Project (3GPP), Mobile Competence Centre ; 6508 Route Des Lucioles ; F-06921 Sophia-Antipolis Cedex ; France; Mar. 2019 (Mar. 1, 2019), pp. 1-335 XP051600713.*

(Continued)

*Primary Examiner* — Kevin C. Harper
*Assistant Examiner* — Henry Baron
(74) *Attorney, Agent, or Firm* — Holland & Hart LLP/Qualcomm

(57) ABSTRACT

A user equipment (UE) may provide feedback regarding beam pairs used for wake-up signal (WUS) transmissions via uplink resources configured for WUS-based beam management feedback. A correspondence between WUSs and uplink resources for feedback may be semi-statically configured via radio resource control (RRC) signaling, may be dynamically indicated by each WUS, etc. In some examples, uplink resources for different UEs may be distinctive (e.g., UE-specific). In some cases, each beam used to transmit the wake-up message (e.g., each WUS) may have separate uplink resources, or all beams may share the same uplink resource (e.g., or some combination of uplink resources). As such, the UE and base station may identify one or more beams of sufficient quality (e.g., for control channel transmissions during a discontinuous reception (DRX) on-duration) based on the feedback (e.g., beam report) conveyed by (Continued)

the UE via the configured uplink resources for WUS-based fast beam management techniques.

30 Claims, 18 Drawing Sheets

(51) Int. Cl.
*H04B 7/08* (2006.01)
*H04W 16/28* (2009.01)
*H04W 72/04* (2009.01)

(52) U.S. Cl.
CPC ..... *H04W 52/0245* (2013.01); *H04W 72/042* (2013.01); *H04W 72/046* (2013.01); *H04W 76/28* (2018.02)

(56) References Cited

OTHER PUBLICATIONS

International Search Report and Written Opinion—PCT/US2020/ 037593—ISA/EPO—dated Sep. 28, 2020.
Qualcomm Incorporated: "PDCCH-based PowerSaving Channel Design," 3GPP Draft, 3GPP TSG-RAN WG1 #97, R1-1907294, PDCCH-based PowerSaving Channel Design, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728734, 16 pages, Retrieved from the Internet: URL: http://www.3gpp.org/ftp/Meetings%5F3GPP% 5FSYNC/RAN1/Docs/R1%2D1907294%2Ezip [retrieved on May 13, 2019] paragraph [2.2.3.1]-paragraph [2.2.3.3].
Qualcomm Incorporated: "Potential Techniques for UE Power Saving", 3GPP Draft, 3GPP TSG-RAN WG1 #96, R1-1903016 Potential Techniques for UE Power Saving, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 16, 2019 (Feb. 16, 2019), XP051600713, 33 pages, Retrieved from the Internet: URL: http://www.3gpp.org/ftp/tsg%5Fran/WG1%5FRL1/TSGR1%5F96/ Docs/R1%2D1903016%2Ezip [retrieved on Feb. 16, 2019] sections 2-4, paragraph[2. 2 .1]-paragraph [2. 2. 2] paragraph [2. 3 .1.1]- paragraph [2. 3 .1.2] paragraph[3. 3 .1]-paragraph [3.3.3] paragraph [3. 4 .1]-paragraph [3. 4 .1].
Qualcomm Incorporated: "Triggering Adaptation of UE Power Consumption Characteristics," 3GPP Draft, 3GPP TSG-RAN WG1 Ad-Hoc Meeting 1901, R1-1900912, Triggering Mechanism For Adaptation, 3rd Generation Partnership Project (3GPP), Mobile Competence Centre, 650, Route Des Lucioles, F-06921, Sophia-Antipolis Cedex, France, vol. RAN WG1, No. Taipei, Taiwan, Jan. 21, 2019-Jan. 25, 2019, Jan. 20, 2019 (Jan. 20, 2019), XP051593758, 12 pages, Retrieved from the Internet: URL: http://www.3gpp.org/ ftp/Meetings%5F3GPP%5FSYNC/RAN1/Docs/R1%2D1900912% 2Ezip [retrieved on Jan. 20, 2019] paragraph [2.1.1]-paragraph [2.2.2] paragraph [02.3].

\* cited by examiner

DISCONTINUOUS RECEPTION WAKE-UP PROCEDURE WITH FAST BEAM MANAGEMENT

CROSS REFERENCE

The present Application for Patent claims the benefit of U.S. Provisional Patent Application No. 62/861,950 by NAM et al., entitled "DISCONTINUOUS RECEPTION WAKE-UP PROCEDURE WITH FAST BEAM MANAGEMENT," filed Jun. 14, 2019, assigned to the assignee hereof, and expressly incorporated by reference herein.

BACKGROUND

The following relates generally to wireless communications, and more specifically to discontinuous reception (DRX) wake-up procedure with fast beam management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include a number of base stations or network access nodes, each simultaneously supporting communication for multiple communication devices, which may be otherwise known as user equipment (UE).

Wireless communication systems may operate in millimeter wave (mmW) frequency ranges, e.g., 28 GHz, 40 GHz, 60 GHz, etc. Wireless communications at these frequencies may be associated with increased signal attenuation (e.g., path loss), which may be influenced by various factors, such as temperature, barometric pressure, or diffraction, among other examples. As a result, signal processing techniques, such as beamforming, may be used to coherently combine energy and overcome the path losses at these frequencies. Due to the increased amount of path loss in mmW communication systems, transmissions from the base station and/or the UE may be beamformed.

Further, a UE may operate in a DRX mode (e.g., a connected mode DRX (C-DRX) mode) where the UE transitions between an active state (e.g., where the UE wakes up to determine if data is available for the UE) and a sleep state (e.g., where the UE shuts down various hardware or processes to conserve power). The UE may determine if data is available (e.g., if physical downlink control channel (PDCCH) data is available during a next DRX on-duration or UE active state) by monitoring for one or more wake-up signals (WUSs) during WUS occasions (e.g., during configured WUS occasions of DRX off-durations or UE sleep states). The WUSs may carry or otherwise convey an indication that the base station has data ready to transmit to the UE during a next DRX on-duration. In such systems, a UE may conserve powering by being configured to only wake-up in an on duration of a DRX cycle when the UE receives a WUS from the base station prior to or within the DRX on-duration. However, conventional techniques for monitoring for wake-up signaling may be deficient.

SUMMARY

The described techniques relate to improved methods, systems, devices, or apparatuses that support discontinuous reception (DRX) wake-up procedures with fast beam management. Generally, the described techniques provide for transmission of beam-swept wake-up signals (WUSs) to a user equipment (UE) (e.g., a UE in a sleep state of a connected mode discontinuous reception (C-DRX) mode) and WUS-based beam feedback reporting by the UE. For example, a base station may transmit WUSs (e.g., instances of a wake-up message) using a beam sweeping configuration. The base station may further configure uplink (UL) resources for the one or more transmitted WUSs (e.g., for the one or more beam pairs used for communication of a wake-up message in the beam sweeping configuration) for beam management feedback.

For example, a UE may be configured by a base station to monitor for a wake-up message during one or more WUS monitoring occasions. The base station may transmit WUSs, according to the beam sweeping configuration, to convey the wake-up message using different transmit beams. The UE may receive one or more of the WUSs, and may provide feedback regarding beam pairs used for the one or more received WUSs via UL resources configured for WUS-based beam management feedback. A correspondence between WUSs and UL resources configured for such feedback may be semi-statically configured via radio resource control (RRC) signaling, may be dynamically indicated by each WUS, etc. In some examples, UL resources for different UEs may be distinctive (e.g., UE-specific). In some cases, each beam used to transmit the wake-up message (e.g., each WUS) may have separate UL resources, or all beams may share the same UL resource (e.g., or some combination of UL resources). As such, the UE and base station may identify one or more beams of sufficient quality (e.g., for control channel transmissions during a DRX on-duration) based on the feedback (e.g., beam reporting) conveyed by the UE via the UL resources configured for WUS-based fast beam management techniques.

A method of wireless communication at a UE is described. The method may include monitoring, in a connected mode during discontinuous reception operation, a wake-up signal occasion using receive beams corresponding to one or more configured beam pairs, the wake-up signal occasion occurring prior to or within a discontinuous reception on-duration, detecting a wake-up message based on the monitoring, identifying, based on the wake-up message, uplink resources prior to or within the discontinuous reception on-duration, and transmitting, using the uplink resources, a beam report for the one or more configured beam pairs based on the wake-up message.

An apparatus for wireless communication at a UE is described. The apparatus may include a processor, memory coupled with the processor, and instructions stored in the memory. The instructions may be executable by the processor to cause the apparatus to monitor, in a connected mode during discontinuous reception operation, a wake-up signal occasion using receive beams corresponding to one or more configured beam pairs, the wake-up signal occasion occurring prior to or within a discontinuous reception on-duration, receive a wake-up message based on the monitoring, identify, based on the wake-up message, uplink resources prior to or within the discontinuous reception on-duration, and transmit, using the uplink resources, a beam report for the one or more configured beam pairs based on the wake-up message.

Another apparatus for wireless communication at a UE is described. The apparatus may include means for monitoring, in a connected mode during discontinuous reception operation, a wake-up signal occasion using receive beams corresponding to one or more configured beam pairs, the wake-up signal occasion occurring prior to or within a discontinuous reception on-duration, detecting a wake-up message based on the monitoring, identifying, based on the wake-up message, uplink resources prior to or within the discontinuous reception on-duration, and transmitting, using the uplink resources, a beam report for the one or more configured beam pairs based on the wake-up message.

A non-transitory computer-readable medium storing code for wireless communication at a UE is described. The code may include instructions executable by a processor to monitor, in a connected mode during discontinuous reception operation, a wake-up signal occasion using receive beams corresponding to one or more configured beam pairs, the wake-up signal occasion occurring prior to or within a discontinuous reception on-duration, detect a wake-up message based on the monitoring, identify, based on the wake-up message, uplink resources prior to or within the discontinuous reception on-duration, and transmit, using the uplink resources, a beam report for the one or more configured beam pairs based on the wake-up message.

Some examples of the method, apparatuses, and non-transitory computer-readable medium described herein may further include operations, features, means, or instructions for receiving an indication of a correspondence between the wake-up message and the uplink resources. Some examples of the method, apparatuses, and non-transitory computer-readable medium described herein may further include operations, features, means, or instructions for identifying a correspondence between the wake-up message and the uplink resources based on the received wake-up message.

In some examples of the method, apparatuses, and non-transitory computer-readable medium described herein, transmitting the beam report may include operations, features, means, or instructions for transmitting an acknowledgement for the received wake-up message using the uplink resources. In some examples of the method, apparatuses, and non-transitory computer-readable medium described herein, transmitting the beam report may include operations, features, means, or instructions for transmitting a received signal power value for the received wake-up message using the uplink resources.

In some examples of the method, apparatuses, and non-transitory computer-readable medium described herein, the wake-up message includes a set of wake-up messages and the uplink resources includes a set of uplink resources, each of the set of uplink resources corresponding to one wake-up message of the set of wake-up messages. In some examples of the method, apparatuses, and non-transitory computer-readable medium described herein, the wake-up message includes a set of wake-up messages and the uplink resources include a single uplink resource corresponding to the set of wake-up messages. In some examples of the method, apparatuses, and non-transitory computer-readable medium described herein, transmitting the beam report may include operations, features, means, or instructions for transmitting an index associated with the received wake-up message.

Some examples of the method, apparatuses, and non-transitory computer-readable medium described herein may further include operations, features, means, or instructions for monitoring a physical downlink control channel (PDCCH) during the discontinuous reception on-duration based on the wake-up message including a wake-up indication for the UE, and receiving a downlink control channel transmission based on the monitoring.

Some examples of the method, apparatuses, and non-transitory computer-readable medium described herein may further include operations, features, means, or instructions for identifying a first beam pair of the one or more configured beam pairs based on the wake-up message, and monitoring a PDCCH during the discontinuous reception on-duration using the first beam pair based on an indication associated with the first beam pair in the beam report. Some examples of the method, apparatuses, and non-transitory computer-readable medium described herein may further include operations, features, means, or instructions for generating the beam report based at least in part on an indication associated with the first beam pair and receiving a physical downlink data channel scheduled by the PDCCH using the first beam pair based at least in part on the generated beam report.

In some examples of the method, apparatuses, and non-transitory computer-readable medium described herein, the monitoring the PDCCH includes monitoring a first control resource set of a set of control resource sets based on identifying the first beam pair. In some examples of the method, apparatuses, and non-transitory computer-readable medium described herein, the monitoring the PDCCH includes monitoring a first control resource set configured for a second beam pair according to the first beam pair based on identifying the first beam pair. Some examples of the method, apparatuses, and non-transitory computer-readable medium described herein may further include operations, features, means, or instructions for determining to remain in a power-saving state during the discontinuous reception on-duration based on the wake-up message including an indication that mobile terminated data may be not present for the UE.

A method of wireless communication at a base station is described. The method may include identifying a group of UEs associated with a set of transmit beams, the group of UEs operating according to discontinuous reception in a connected mode, transmitting a set of wake-up messages during a wake-up signal occasion prior to or within discontinuous reception on-durations associated with the group of UEs, where each wake-up message of the set of wake-up messages is transmitted using a different transmit beam of the set of transmit beams, identifying uplink resources corresponding to the set of wake-up messages, and receiving a beam report from at least one of the group of UEs over the uplink resources based on the transmitted set of wake-up messages.

An apparatus for wireless communication at a base station is described. The apparatus may include a processor, memory coupled with the processor, and instructions stored in the memory. The instructions may be executable by the processor to cause the apparatus to identify a group of UEs associated with a set of transmit beams, the group of UEs operating according to discontinuous reception in a connected mode, transmit a set of wake-up messages during a wake-up signal occasion prior to or within discontinuous reception on-durations associated with the group of UEs, where each wake-up message of the set of wake-up messages is transmitted using a different transmit beam of the set of transmit beams, identify uplink resources corresponding to the set of wake-up messages, and receive a beam report from at least one of the group of UEs over the uplink resources based on the transmitted set of wake-up messages.

Another apparatus for wireless communication at a base station is described. The apparatus may include means for identifying a group of UEs associated with a set of transmit beams, the group of UEs operating according to discontinuous reception in a connected mode, transmitting a set of wake-up messages during a wake-up signal occasion prior to or within discontinuous reception on-durations associated with the group of UEs, where each wake-up message of the set of wake-up messages is transmitted using a different transmit beam of the set of transmit beams, identifying uplink resources corresponding to the set of wake-up messages, and receiving a beam report from at least one of the group of UEs over the uplink resources based on the transmitted set of wake-up messages.

A non-transitory computer-readable medium storing code for wireless communication at a base station is described. The code may include instructions executable by a processor to identify a group of UEs associated with a set of transmit beams, the group of UEs operating according to discontinuous reception in a connected mode, transmit a set of wake-up messages during a wake-up signal occasion prior to or within discontinuous reception on-durations associated with the group of UEs, where each wake-up message of the set of wake-up messages is transmitted using a different transmit beam of the set of transmit beams, identify uplink resources corresponding to the set of wake-up messages, and receive a beam report from at least one of the group of UEs over the uplink resources based on the transmitted set of wake-up messages.

Some examples of the method, apparatuses, and non-transitory computer-readable medium described herein may further include operations, features, means, or instructions for transmitting an indication of a correspondence between the set of wake-up messages and the uplink resources. In some examples of the method, apparatuses, and non-transitory computer-readable medium described herein, a wake-up message of the set of wake-up messages includes an indication of a correspondence between the wake-up message and an uplink resource of the uplink resources. In some examples of the method, apparatuses, and non-transitory computer-readable medium described herein, receiving the beam report may include operations, features, means, or instructions for receiving an acknowledgement for one or more of the set of wake-up messages over an uplink resource of the uplink resources.

In some examples of the method, apparatuses, and non-transitory computer-readable medium described herein, receiving the beam report may include operations, features, means, or instructions for receiving a received signal power value for one or more of the set of wake-up messages over an uplink resource of the uplink resources. In some examples of the method, apparatuses, and non-transitory computer-readable medium described herein, the uplink resources include a set of uplink resources, each of the set of uplink resources corresponding to one wake-up message of the set of wake-up messages. In some examples of the method, apparatuses, and non-transitory computer-readable medium described herein, the uplink resources include a single uplink resource corresponding to the set of wake-up messages.

Some examples of the method, apparatuses, and non-transitory computer-readable medium described herein may further include operations, features, means, or instructions for identifying that one or more UEs of the group of UEs may have downlink data buffered at the base station, setting one or more wake-up indication bits in the set of wake-up messages based on the downlink data buffered at the base station for the one or more UEs, and transmitting, in the discontinuous reception on-durations, a PDCCH transmission to the one or more UEs based on setting the one or more wake-up indication bits. Some examples of the method, apparatuses, and non-transitory computer-readable medium described herein may further include operations, features, means, or instructions for identifying that none of the group of UEs may have downlink data buffered at the base station, and setting wake-up indication bits in the set of wake-up messages to indicate no downlink data being present at the base station based on the identifying that none of the group of UEs may have downlink data buffered at the base station.

Some examples of the method, apparatuses, and non-transitory computer-readable medium described herein may further include operations, features, means, or instructions for identifying, for a first UE of the group of UEs, a first transmit beam based on the received beam report, and transmitting, in the discontinuous reception on-durations, a PDCCH transmission using the first transmit beam. In some examples of the method, apparatuses, and non-transitory computer-readable medium described herein, transmitting the PDCCH transmission may include operations, features, means, or instructions for transmitting the PDCCH transmission in a first control resource set associated with the first transmit beam. In some examples of the method, apparatuses, and non-transitory computer-readable medium described herein, transmitting the PDCCH transmission may include operations, features, means, or instructions for transmitting the PDCCH transmission in a control resource set configured for a second transmit beam.

DETAILED DESCRIPTION

Figure 1:
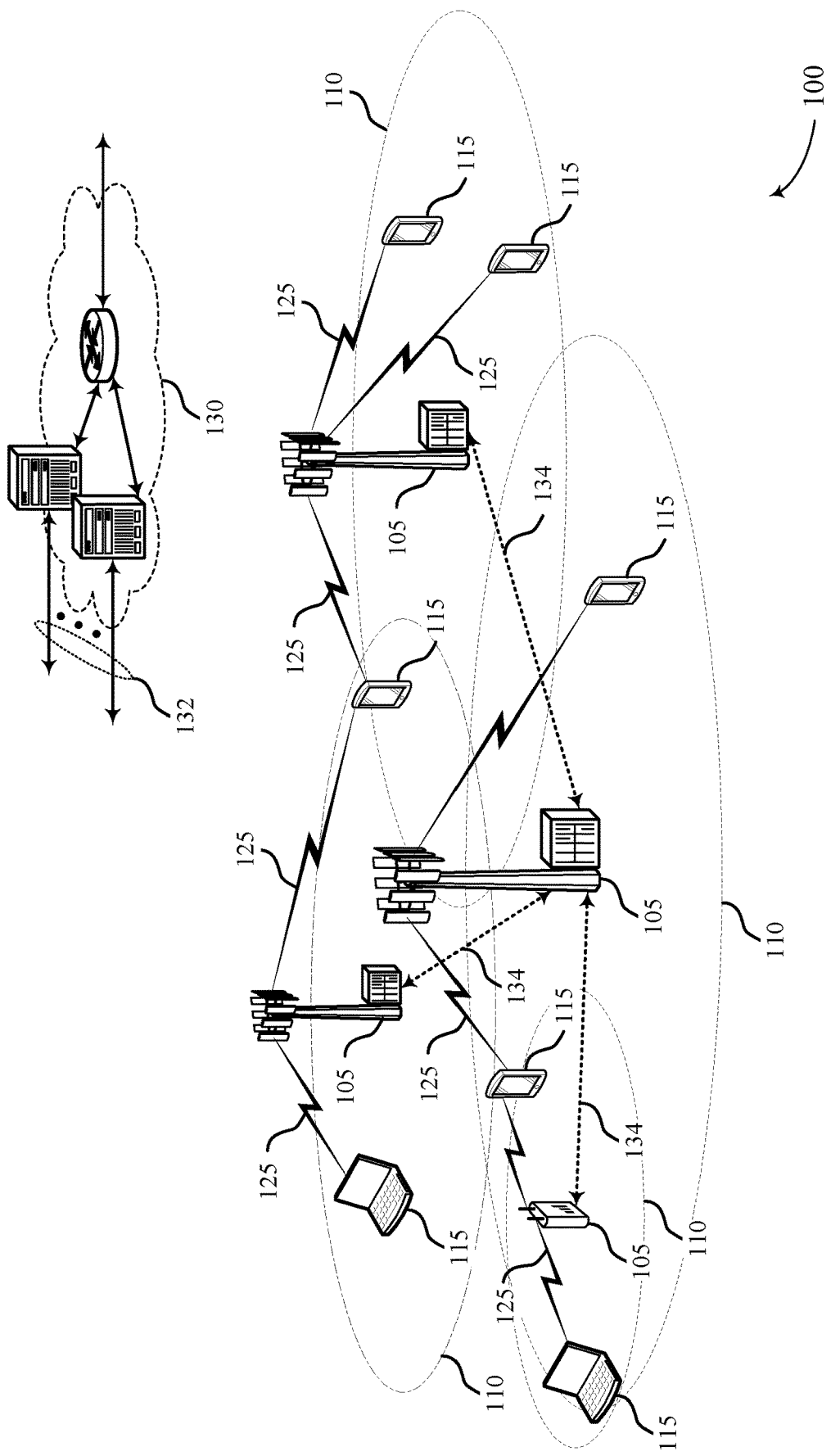
FIG. 1 illustrates an example of a system for wireless communications that supports discontinuous reception (DRX) wake-up procedure with fast beam management in accordance with aspects of the present disclosure.

A wireless device may implement a discontinuous reception (DRX) cycle to enable the efficient use of battery power for reception of downlink (DL) transmissions. A base station and a user equipment (UE) may establish a radio resource control (RRC) connection and the UE may enter a sleep state when not actively communicating with the base station. For example, during RRC connection establishment, a DRX configuration, including a DRX-On cycle and DRX-Off cycle duration, may be configured in an RRC connection setup request or an RRC connection reconfiguration request. The DRX configuration may determine how frequently the UE is scheduled to wake-up and be available for receiving DL data in accordance with the configured DRX cycle durations. The UE may determine if DL data is present for the UE by monitoring for one or more wake-up signals (WUSs) during WUS occasions (e.g., during configured WUS occasions of DRX off-durations or UE sleep states). The WUSs may carry or otherwise convey an indication that the base station has data ready to transmit to the UE during a next DRX on-duration. In such systems, a UE may conserve power by being configured to only wake-up in an on-duration of a DRX cycle when the UE receives a WUS from the base station prior to or within the DRX on-duration.

Some wireless communications systems may support beamformed transmissions between the base station and the UE. For instance, a wireless communications system may operate in millimeter wave (mmW) frequency ranges (e.g., 28 GHz, 40 GHz, 60 GHz, etc.). Wireless communications at mmW frequencies may be associated with increased signal attenuation (e.g., path loss), which may be influenced by various factors, such as temperature, barometric pressure, or diffraction, among other examples. As a result, signal processing techniques, such as beamforming, may be used to coherently combine energy and overcome path losses at these frequencies. A base station may use a number of antenna ports associated with rays of antennas for beamformed DL transmissions to a UE and for directional receive beams of the base station. Similarly, a UE may utilize beamforming for beamformed uplink (UL) transmissions to the base station and for directional receive beams of the UE.

As such, a base station and a UE may have one or more active transmit and receive beams (e.g., beam pairs) for communications. In some aspects, beam pairs used for communications may degrade over time due to, for example, changing channel conditions, UE mobility, etc. As such, a base station and UE may perform beam management procedures to maintain and update beam pairs used for communications. For example, a UE may transmit feedback information regarding the channel performance of the currently active transmit beams. However, in some cases, UE reporting of measured beam qualities may only be possible during DRX on-durations (e.g., such that beam pairs may degrade or become unsuitable for communications during DRX off-durations, during an offset between a WUS and a DRX on-duration, etc.). For example, in some cases a preferred transmit beam (e.g., for a physical downlink control channel (PDCCH) transmission during a next DRX on-duration) may change between DRX on-durations. This may result in the UE attempting to decode the PDCCH multiple times at the beginning of a DRX on-duration, or in beam management consuming a substantial percentage of the DRX on-duration before a PDCCH can be successfully decoded. Communication latency or power consumption at the UE using such techniques may be negatively impacted.

As such, beamformed (e.g., beam swept) data transmission and reception between the UE and base station, in accordance with a DRX configuration at the UE, may include procedures to establish beam selection during WUS procedures, and beam refinement (e.g., prior to PDCCH transmission). In some cases, a wake-up message may initiate a DRX-On cycle at the UE without including resource allocation or grant information. In such wireless communications systems supporting beamforming procedures, a wake-up message may be transmitted as one or more WUSs in a beam sweeping manner (e.g., multiple instances of a wake-up message may be transmitted by a base station in WUSs over different transmit beams). Each WUS may thus correspond to a transmit beam or beam direction of some beam sweeping pattern. Further, the base station may configure UL resources for beam management feedback. A UE may receive one or more WUSs (e.g., based on WUS monitoring during a WUS occasion) and may transmit feedback (e.g., a reception acknowledgement, one or more beam quality parameters such as a received signal power value, etc.) corresponding to one or more of the received WUSs using the configured UL resources. In some cases, the UL resources may be configured by the base station via RRC signaling, may be indicated in the one or more WUSs (e.g., in a field of each WUS), etc.

A UE may thus provide feedback regarding beam pairs used for WUS transmissions via configured UL resources for beam feedback. As discussed, a correspondence between WUSs and UL resources for feedback may be semi-statically configured via RRC signaling, may be dynamically indicated by each WUS, etc. UL resources for different UEs may be distinctive (e.g., UE-specific). For example, the UL resources may be allocated for different UEs using different time, frequency, code sequences, etc. In some cases (e.g., for multi-beam WUS transmission of a wake-up message), each beam (e.g., each WUS) may have separate UL resources or all beams may share the same UL resource (e.g., or may share some combination of UL resources). In the case that a pre-configured beam to be used for PDCCH during a DRX on-duration is sufficient, the UE may receive the PDCCH data using the pre-configured beam. Alternatively, the UE and base station may identify one or more alternative beams of sufficient quality based on the feedback (e.g., beam report) conveyed by the UE via the configured UL resources for WUS-based fast beam management techniques. Such techniques may provide for faster and more efficient beam management, as the base station and UE may manage and/or maintain beam pairs used for communications outside of (e.g., in advance of) DRX on-durations.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various operations may be added, omitted, or combined. Also, features described with respect to some examples may be combined in some other examples.

Aspects of the disclosure are initially described in the context of a wireless communications system. Example WUS configurations, an example timeline, and an example process flow illustrating aspects of the discussed techniques are then described. Aspects of the disclosure are further illustrated by and described with reference to apparatus diagrams, system diagrams, and flowcharts that relate to DRX wake-up procedures with fast beam management.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include UL transmissions from a UE 115 to a base station 105, or DL transmissions, from a base station 105 to a UE 115. DL transmissions may also be called forward link transmissions while UL transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1 or other interface). Base stations 105 may communicate with one another over backhaul links 134 (e.g., via an X2 or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support mmW communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include DL transmissions, UL transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communication system may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g., synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operates according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the RRC protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $T_s=1/30,720,000$ seconds. Time intervals of a communications resource may be organized according to radio frames each having a duration of 10 milliseconds (ms), where the frame period may be expressed as $T_f = 307,200 \, T_s$. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be DL or UL (e.g., in an FDD mode), or be configured to carry DL and UL communications (e.g., in a TDD mode). In some examples, signal waveforms transmitted over a carrier may be made up of multiple sub-carriers (e.g., using multi-carrier modulation (MCM) techniques such as orthogonal frequency division multiplexing (OFDM) or DFT-s-OFDM).

The organizational structure of the carriers may be different for different radio access technologies (e.g., LTE, LTE-A, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a DL carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple DL CCs and one or more UL CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator is allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across frequency) and horizontal (e.g., across time) sharing of resources.

PDCCH carries downlink control information (DCI) in control channel elements (CCEs), which may consist of nine logically contiguous resource element groups (REGs), where each REG contains four resource elements (REs). DCI includes information regarding DL scheduling assignments, UL resource grants, transmission scheme, UL power control, HARQ information, modulation and coding scheme (MCS), and other information. The size and format of the DCI messages can differ depending on the type and amount of information that is carried by the DCI. For example, if spatial multiplexing is supported, the size of the DCI message is large compared to contiguous frequency allocations. Similarly, for a system that employs MIMO, the DCI must include additional signaling information. DCI size and format depend on the amount of information as well as factors such as bandwidth, the number of antenna ports, and duplexing mode.

PDCCH can carry DCI messages associated with multiple users, and each UE 115 may decode the DCI messages that are intended for it. For example, each UE 115 may be assigned a C-RNTI and CRC bits attached to each DCI may be scrambled based on the C-RNTI. To reduce power consumption and overhead at the user equipment, a limited set of control channel element (CCE) locations can be specified for DCI associated with a specific UE 115. CCEs may be grouped (e.g., in groups of 1, 2, 4 and 8 CCEs), and a set of CCE locations in which the user equipment may find relevant DCI may be specified. These CCEs may be known as a search space. The search space can be partitioned into two regions: a common CCE region or search space and a UE-specific (dedicated) CCE region or search space. The common CCE region is monitored by all UEs 115 served by a base station 105 and may include information such as paging information, system information, random access procedures and the like. The UE-specific search space may include user-specific control information. CCEs may be indexed, and the common search space may start from, for example, CCE 0. The starting index for a UE-specific search space may depend on the C-RNTI, the subframe index, the CCE aggregation level and a random seed. A UE 115 may attempt to decode DCI by performing a process known as a blind decode, during which search spaces are randomly decoded until the DCI is detected. During a blind decode, the UE 115 may attempt descramble all potential DCI messages using its C-RNTI, and perform a CRC check to determine whether the attempt was successful.

Synchronization (e.g., cell acquisition) may be performed using synchronization signals or channels transmitted by a network entity (e.g., a base station 105). In some cases, a base station 105 may transmit synchronization signal (SS) blocks (which may be referred to as SS bursts) containing discovery reference signals. For example, SS blocks may include a primary synchronization signal (PSS), a secondary synchronization signal (SSS), a physical broadcast channel (PBCH), or other synchronization signals (e.g., a tertiary synchronization signal (TSS)). In some examples, the signals included in an SS block may include a PSS, an SSS, a PBCH, and/or other synchronization signals that are time division multiplexed. For example, the signals included in an SS block may include a time division multiplexed first PBCH, SSS, second PBCH, and PSS (transmitted in the indicated order), or a time division multiplexed first PBCH, SSS, PSS, and second PBCH (transmitted in the indicated order), etc. In other examples, PBCH transmissions may be transmitted in a subset of SS block time resources (e.g., in two symbols of an SS block), and synchronization signals (e.g., primary synchronization signals (PSSs) and secondary synchronization signals (SSSs)) may be transmitted in another subset of SS block time resources. Furthermore, in deployments that use mmW transmission frequencies, multiple SS blocks may be transmitted in different directions using beam sweeping in an SS burst, and SS bursts may be periodically transmitted according to an SS burst set. In cases where a base station 105 may transmit omni-directionally, an SS block may be periodically transmitted according to a configured periodicity.

For example, a base station 105 may transmit multiple instances of an SS block, on different beams, during a periodic broadcast channel transmission time interval (BCH TTI). In other cases, a base station 105 may transmit multiple instances of an SS block on a same beam, or in an omnidirectional manner, during a periodic BCH TTI. A UE 115 attempting to access a wireless network may perform an initial cell search by detecting a PSS from a base station 105. The PSS may enable synchronization of symbol timing and may indicate a physical layer identity value. The PSS may be utilized to acquire timing and frequency as well as a physical layer identifier. The UE 115 may then receive an SSS. The SSS may enable radio frame synchronization, and may provide a cell group identity value. The cell group identity value may be combined with the physical layer identifier to form the physical cell identifier (PCID), which identifies the cell. The SSS may also enable detection of a duplexing mode and a cyclic prefix (CP) length. An SSS may be used to acquire other system information (e.g., subframe index). The PBCH may be used to acquire additional system information needed for acquisition (e.g., bandwidth, frame index, etc.). In some cases, the PBCH may carry master information block (MIB) and one or more system information blocks (SIBS) for a given cell.

Because a base station 105 may not know the locations of devices attempting to synchronize with a cell of the base station, SS blocks may be successively transmitted in a beam swept manner (e.g., across multiple symbol periods). In some cases, a base station 105 may transmit the SS blocks using multiple transmit beams. A UE 115 may receive one or more of the SS blocks and determine a suitable DL beam pair (e.g., based on a signal quality of the SS block being greater than a threshold). However, the beams over which the SS blocks are transmitted may be relatively coarse (e.g., broad). Accordingly, communications between the UE 115 and base station 105 may benefit from beam refinement, in which narrower UL and DL receive and transmit beams are selected. The width of a given beam (e.g., a narrow beam, a broad beam, etc.) may be modified by adjusting weighting of one or more of the elements in a transmitting or receiving antenna array. Such adjustments may be empirically determined by a receiving device (e.g., based on measurements of one or more reference signals). Each UE 115 attempting to access a given cell may receive a set of DL reference signals and transmit a set of UL reference signals to enable such beam refinement.

In some cases, a UE 115 receiving an SS block may perform a cell measurement on the SS block, and may also acquire a network associated with a base station that transmitted the SS block. To determine a beam on which the SS block is transmitted, or to determine a timing of the SS block within a sequence of SS blocks (and in some cases, to fully determine the timing of the SS block or a synchronization signal therein), a UE 115 may have to decode a PBCH within the SS block and obtain an SS block index from the SS block (e.g., because the SS block index may convey a beam index associated with the SS block and/or the location of the SS block within a sequence of SS blocks).

In some cases, a base station 105 may transmit a WUS to a UE 115 to transition the UE 115 into an active state during a DRX on-duration (e.g., to wake a UE 115 to receive DL control data during a DRX on-duration). Parameters of the WUS may include a digital sequence or code to distinguish the WUS from ambient radio transmissions or other interference. The WUS may include one or more pseudo-omni beams for transmission, and additionally or alternatively, may consist of a number of beams equivalent to the beam cardinality for SS burst transmission. Additionally, the WUS may include instructions for initiating a wake-up procedure, without additional resource allocation or grant payloads. In some cases, the WUS may consist of a narrowband tone. The UE 115 may determine the presence or absence of the narrowband tone through an energy detection via an energy detector. In other cases, the WUS may consist of a UE specific reference signal directed to the UE 115. The UE 115 may descramble the tones of the reference signal transmission according to a correlator. In other cases, the WUS may consist of a narrowband PDCCH signal conveyed through a specific search space indicated to the UE 115. The one or more WUS implementations may conserve decoding resources at the UE 115 and therefore reduce power consumption.

In some cases, a UE 115 may monitor a communication link 125 continuously for an indication that the UE 115 may receive data. In other cases (e.g., to conserve power and extend battery life) a UE 115 may be configured for DRX operation with a DRX cycle. DRX operation may refer to, for example, UE 115 operation in a DRX mode involving both DRX on-durations and DRX off-durations. A DRX cycle consists of an "on-duration" when the UE 115 may monitor for control information (e.g., on PDCCH) and a "DRX-period" or "off-duration" when the UE115 may power down radio components. In some cases, a UE 115 may be configured with a short DRX cycle and a long DRX cycle. In some cases, a UE 115 may enter a long DRX cycle if it is inactive for one or more short DRX cycles. The transition between the short DRX cycle, the long DRX cycle, and continuous reception may be controlled by an internal timer or by messaging from a base station 105. A UE 115 may receive scheduling messages on PDCCH during the on-duration. While monitoring PDCCH for a scheduling message, the UE 115 may initiate a "DRX Inactivity Timer." If a scheduling message is successfully received, the UE 115 may prepare to receive data and the DRX Inactivity Timer may be reset. When the DRX Inactivity Timer expires without receiving a scheduling message, the UE 115 may move into a short DRX cycle and may start a "DRX Short Cycle Timer." When the DRX Short Cycle Timer expires, the UE 115 may resume a long DRX cycle.

In wireless communications system 100, devices may be able to communicate over multiple portions of a system bandwidth at the same time. Such a configuration may improve throughput for the communications or otherwise benefit the system. However, because transmissions over the different bandwidth portions may experience different paths (e.g., may be transmitted from different antennas, may experience different degrees of path loss, may be received over different antennas, etc.), a receiving device may have to process the transmissions independently (e.g., may not be able to exploit signal processing of an antenna port on one sub-band to facilitate processing of a quasi-co-located (QCLed) antenna port on another sub-band). In other cases, two or more antenna ports may be assumed to have a QCL relationship. That is, a UE 115 may be able to derive the properties of a first channel (e.g., delay spread, Doppler spread, frequency shift, average power, etc.) transmitted on a first antenna port from measurements made on a second channel transmitted on a second antenna port. Furthermore, a base station 105 may signal an indication of a QCL relationship (e.g., a spatial relationship, etc.) between the two portions of bandwidth (e.g., which may be referred to as carriers or sub-bands herein) to allow a UE 115 to transmit (or receive) a second signal over a second portion of the bandwidth based at least in part on processing of a first signal received over the first portion of the bandwidth. In some cases, exploiting QCL relationships (or reciprocal QCL relationships) may reduce overhead for a wireless system.

Wireless communications system 100 may support C-DRX wake-up procedures over mmW frequency band resources. Each of the base stations 105 and UEs 115 may use a plurality of antenna ports associated with rays to emit one or more transmit beams for beamformed (e.g., beam sweep) data transmission and reception. For example, a base station 105 may use beamforming techniques for DL reference signals, WUSs, PDCCH transmissions, and physical downlink shared channel (PDSCH) transmissions to one or more configured UEs 115. Similarly, the UEs 115 may implement beamforming techniques for receive beam training, DL transmit beam selection, and UL transmission including beam recovery signal transmission.

Each of the one or more UEs 115 within wireless communications system 100 may be camped on a geographic coverage area 110 associated with a base station 105. The one or more UEs 115 may establish an RRC connection with the associated base station 105. During RRC connection establishment, one or more UEs 115 may implement a DRX configuration to enable efficient use of battery power for reception of DL transmissions. The DRX configuration, including a DRX on-duration and DRX off-duration, may be configured at the UE 115 via an RRC connection setup request of RRC connection reconfiguration request. The DRX configuration may determine how frequently the one or more UEs 115 are scheduled to wake-up and receive DL data in accordance with the configured DRX cycle durations. In wireless communications system 100, a UE 115 may determine if DL data is present for transmission to the UE 115 during a next DRX on-duration or UE active state by monitoring for one or more WUSs during WUS occasions (e.g., during configured WUS occasions which may overlap with DRX off-durations or UE sleep states). The WUSs may carry or otherwise convey a wake-up message, which may include an indication that the base station 105 has data ready to transmit to the UE 115 during a next DRX on-duration. In such systems, a UE 115 may conserve powering by being configured to only wake-up in an on duration of a DRX cycle when the UE 115 receives a wake-up message (e.g., a wake-up message including a wake-up indication for the UE 115) from the base station 105 prior the DRX on-duration.

In such wireless communications systems supporting beamforming procedures (e.g., such as wireless communications system 100), a wake-up message may be transmitted by a base station 105 as one or more WUSs in a beam sweeping manner (e.g., multiple instances of a wake-up message may be transmitted by a base station 105 in WUSs over different transmit beams). Each WUS may thus correspond to a transmit beam or beam direction of some beam sweeping pattern. Further, the base station 105 may configure UL resources for beam management feedback from one or more UEs 115. A UE 115 may receive one or more WUSs (e.g., based on WUS monitoring during a WUS occasion) and may transmit feedback (e.g., a reception acknowledgement (ACK), one or more beam quality parameters such as a received signal power value, etc.) corresponding to one or more of the received WUSs using the configured UL resources. In some cases, the UL resources may be configured by the base station 105 via RRC signaling, may be indicated in the one or more WUSs (e.g., a corresponding UL resource may be indicated in a field of each WUS), etc.

Utilizing such UL resources configured for WUS-based beam management feedback, a UE 115 may provide feedback regarding transmit beams or beam pairs (e.g., base station 105 transmit beams and UE 115 receive beam pairs) used for WUS transmissions. A correspondence between WUSs and UL resources for feedback may be semi-statically configured via RRC signaling, may be dynamically indicated by each WUS, etc. In some examples, UL resources for different UEs 115 may be distinctive (e.g., UE-specific). In some cases, each beam used to transmit the wake-up message (e.g., each WUS) may have separate UL resources, or all beams may share the same UL resource (e.g., or some combination of UL resources). As such, a UE 115 and a base station 105 may identify one or more beams of sufficient quality (e.g., for control channel transmissions during a DRX on-duration) based on the feedback (e.g., based on a beam report) conveyed by the UE 115 via the configured UL resources for WUS-based fast beam management techniques.

Figure 2:
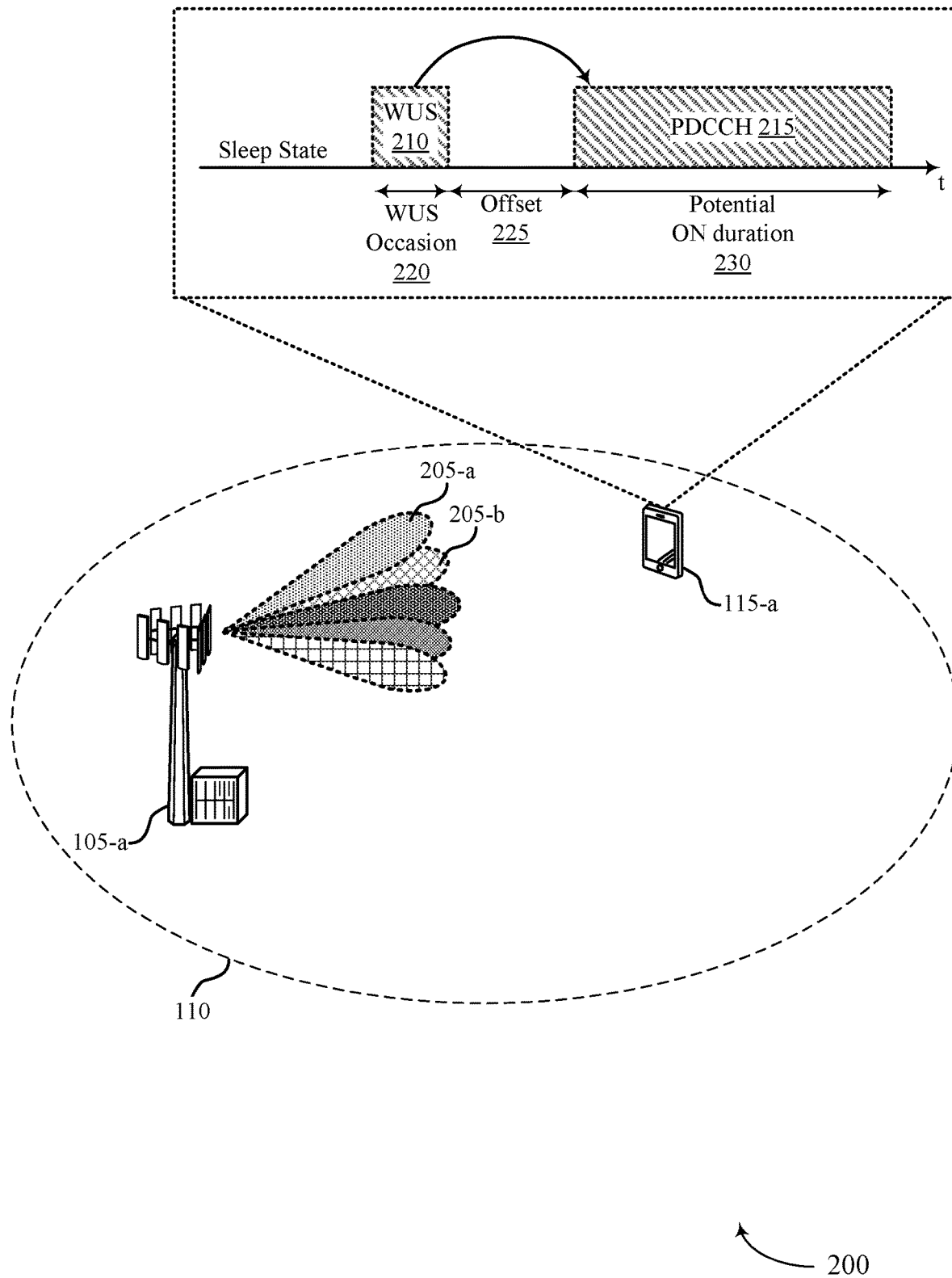
FIG. 2 illustrates an example of a wireless communications system that supports DRX wake-up procedures with fast beam management in accordance with aspects of the present disclosure.

FIG. 2 illustrates an example of a wireless communications system 200 that supports DRX wake-up procedures with fast beam management in accordance with aspects of the present disclosure. In some examples, wireless communications system 200 may implement aspects and features of wireless communications system 100. For example, wireless communications system 200 includes base station 105-*a* and UE 115-*a*. Base station 105-*a* may be an example of a base station 105 described with reference to FIG. 1, and may perform WUS beam sweeping procedures and UL resource configuration for WUS-based fast beam management in accordance with techniques described herein. UE 115-*a* may be an example of UE 115 described with reference to FIG. 1, and may monitor for WUSs during WUS occasions, identify UL resources for WUS-based fast beam management techniques, and perform WUS-based fast beam management procedures in accordance with the techniques described herein.

In wireless communications system 200, UE 115-*a* may support operation in a DRX mode or C-DRX mode where the UE 115-*a* may transition to a sleep state (e.g., a sleep mode, a DRX off state, a DRX off-duration, etc.) and wake-up periodically to monitor for data or control information from base station 105-*a* in accordance with a DRX cycle. As such, UE 115-*a* may save power since UE 115-*a* may not have to constantly stay awake or constantly monitor for data or control information from base station 105-*a*. In some cases, to further limit power consumption, UE 115-*a* may be configured to only wake-up in an on-duration 230 state of the DRX cycle if UE 115-*a* receives a wake-up indication from base station 105-*a* prior to the on-duration 230 (e.g., in a wake-up message, which may be transmitted from base station 105-*a* in one or more WUSs 210 via one or more transmit beams 205). That is, UE 115-*a* may determine if data is available (e.g., if PDCCH data 215 is available during a next DRX on-duration 230) by monitoring for one or more WUSs 210 during WUS occasions 220 (e.g., during configured WUS occasions 220 of DRX off-durations or UE 115-*a* sleep states). The WUSs 210 may carry or otherwise convey a wake-up message that may include or refer to an indication that base station 105-*a* has data ready to transmit to UE 115-*a* during a next DRX on-duration 230. The WUS occasions 220 may occur prior to the DRX on-duration 230 or during the DRX on-duration 230, in some cases.

Wireless communications system 200 may further support communications at mmW frequencies that may be associated with increased signal attenuation (e.g., path loss), which may be influenced by various factors, such as temperature, barometric pressure, diffraction, etc. As a result, signal processing techniques, such as beamforming, may be used to coherently combine energy and overcome path losses at these frequencies. As such, for improved robustness, base station 105-*a* may transmit WUSs 210 in a beam sweeping manner (e.g., base station 105-*a* may transmit a first instance of a wake-up message in a WUS 210 via transmit beam 205-*a*, a second instance of a wake-up message in a WUS 210 via transmit beam 205-*b*, etc.). In some cases, two or more UEs 115 may share the same PDCCH resources for DCI. In such cases, the two or more UEs 115 may also share a same set of sweeping beams (e.g., transmit beams 205) by base station 105-*a* for WUS 210 transmissions.

In some cases, however, beams used for communications between UE 115-*a* and base station 105-*a* (e.g., base station 105-*a* transmit beams 205, UE 115-*a* receive beams, beam pairs used between base station 105-*a* and UE 115-*a*, etc.) may degrade over time due to, for example, changes in channel conditions (e.g., due to changes in communications system resource utilization, temperature, barometric pressure, diffraction, etc.), UE 115-*a* mobility, etc. As such, in some examples, a pre-configured beam for PDCCH data 215 transmission (e.g., PDCCH data 215 transmission during an on-duration 230 triggered by a WUS 210) may degrade or become no longer suitable for such communications.

For example, for efficient communications in mmW systems, beams for WUSs (e.g., transmit beams 205 at base station 105-*a* and receive beams at UE 115-*a*) may be maintained via beam management procedures. Beam management may include beam measurement and beam reporting by UE 115-*a*, as well as potential beam updates by base station 105-*a*. In some cases, SS/PBCH blocks and/or channel state information reference signal (CSI-RS) may be used for such beam management procedures. However, in some cases, UE 115-*a* reporting of measured beam qualities to base station 105-*a* and UE 115-*a* receiving of beam updates from base station 105-*a* may occur during DRX on-durations 230. Without beam reporting and beam updates during the DRX off-duration, beam maintenance may rely on beam failure detection (BFD)/beam failure recovery (BFR) procedures. However, BFR may only be triggered (e.g., UE 115-a may notify base station 105-a with beam failure event by sending random access channel (RACH) messages) when all beam pairs fail. If there is at least one beam pair with acceptable quality, BFR may not be triggered (e.g., BFR may not be triggered in cases of partial beam failure). Beam management (e.g., beam reporting and beam updating) may be performed after the UE 115-a receives a control channel or reference signal (e.g., CSI-RS) during the C-DRX on-duration, however additional delays may be incurred.

As such, according to the techniques described herein, base station 105-a may configure UE 115-a with UL resources for WUS-based beam management techniques. Base station 105-a may transmit a wake-up message in one or more WUSs 210 in a beam sweeping manner over base station 105-a transmit beams 205. If at least one beam pair among the beam sweeping set is suitable (e.g., can reach UE 115-a with acceptable signal quality), the UE 115-a may detect the WUS 210 associated with the beam pair, identify an UL resource configuration for feedback that corresponds to the WUS 210, and transmit beam management feedback (e.g., an ACK, received signal power value, etc. corresponding to the received WUS 210) via the UL resource configuration. Each UE, or a sub-group of UEs, may be semi-statically configured (e.g., via RRC) with UL resources for feedback (e.g., within or outside the next on-duration 230). In some cases, the UL resource may be dynamically indicated by the WUS 210. UL resource configurations (e.g., frequency, time, code sequence, etc.) for different UEs may be distinctive. For multi-beam WUSs 210, each transmit beam 205 (e.g., feedback for each WUS 210) may have a separate UL resource configuration, all transmit beams 205 (e.g., feedback for all WUSs 210) may share the same UL resource, or transmit beams 205 (e.g., feedback for WUSs 210) may share a combination of same UL resources. The UL feedback resources may be used for acknowledgement feedback (e.g., ACKs) and/or WUS 210 beam quality (e.g., received signal power values) report.

For example, if at least one UE (e.g., such as UE 115-a) associated with PDCCH-based WUS has DL data in the buffer (e.g., to be served in the next on-duration 230), base station 105-a may transmit a WUS 210 with a wake-up indication field set to 1 for the corresponding UE (e.g., for the UE 115-a). Base station 105-a may repeat the WUS 210 with different transmit beams 205 configured for WUS beam sweeping. Even when there is no DL data, base station 105-a may still transmit WUSs with wake-up indication fields set to 0 (e.g., a "dummy" WUS may be used by UE 115-a at least for fast beam management procedures, even if the WUS does not wake-up the UE 115-a for a next on-duration 230 as the wake-up indication is set to 0).

If UE 115-a detects one or more WUSs 210 during a WUS occasion 220, UE 115-a may send beam management feedback (e.g., a beam report) via the UL resource configuration(s) corresponding the to one or more WUSs 210 (e.g., through the corresponding UL resource(s)). For example, if WUS is detected for at least one beam, UE 115-a may send an ACK (e.g., similar to HARQ-ACK) and/or the measured quality of the WUS beam (e.g., a received signal power value for the WUS beam) to base station 105-a through the corresponding UL resource. The report (e.g., beam management feedback for the detected WUS) may be sent to base station 105-a regardless of the value of the wake-up indication field included in the WUS. In another example, if a single UL resource is shared among different WUS beams, UE 115-a may send the indices of detected WUS beams as well as ACK and/or beam quality reports. In some cases, if no WUS is detected during a WUS occasion 220, UE 115-a may not send WUS-based beam management feedback to base station 105-a.

After receiving such feedback from UE 115-a, base station 105-a may identify or determine which beams among the multiple WUS beams (e.g., which transmit beam 205 of the transmit beams 205 used for beam sweeping of the WUSs 210) are suitable (e.g., can reach UE 115-a with acceptable signal quality). For example, base station 105-a may interpret UE feedback of ACKs, received signal power values, etc. for WUSs 210 received by UE 115-a, and may keep track of beam qualities (e.g., or keep track of beams suitable for PDCCH data 215) for each UE (e.g., based on WUS-based beam management feedback or reports received from UEs served by the beam swept WUSs 210). If UE 115-a is woken up by a transmitted WUS (e.g., if a transmitted WUS 210 includes a wake-up indication set to 1), base station 105-a may use suitable (e.g., healthy) beams for control/data communication with the UE 115-a, until any further potential beam update is performed. For such purposes, there may be explicit correspondence (e.g., QCL relationship) between a WUS beam and a control resource set (CORESET). For example, if a beam 1 (e.g., beam 205-a) corresponds to a CORESET 1 and a beam 2 (e.g., beam 205-b) corresponds to a CORESET 2, if UE 115-a can only detect beam 1 and reports beam 1 to base station 105-a, the control channel (e.g., PDCCH) may be transmitted through CORESET 1. In some other cases, there may be implicit correspondence between a WUS beam and a CORESET. For example, in a scenario with three WUS beams and one CORESET configuration, UE 115-a and base station 105-a may assume that the beam (e.g., transmission configuration indicator (TCI) state configuration) for the CORESET may be overridden by the best WUS beam. That is, even when the CORESET is configured for beam 2, if the UE reports beam 1 as the beam with the highest received signal power, the CORESET may be implicitly reconfigured for beam 1 for the C-DRX on-duration.

In some cases, each transmit beam 205 may correspond to a TTI. For example, first transmit beam 205-a may correspond to first TTI, second transmit beam 205-b may correspond to second TTI, and so on. In some examples, TTIs for each transmit beam used for WUS 210 beam sweeping may fall within a single WUS occasion 220. In other examples, one or more TTIs for transmit beams 205 used for WUS 210 beam sweeping may fall within several WUS occasions 220. Generally, one or more WUS occasions 220 may be configured, where one or more WUSs 210 may be conveyed in each WUS occasion 220. UE 115-a may receive the WUS 210 transmissions over a set of TTI duration(s) (e.g., symbol, slot). Each TTI may correspond to a transmit beam 205 of the received wake-up message transmission (e.g., of the received WUS 210 transmissions). In some cases, UE 115-a may be pre-configured to individually monitor one or more transmit beams of the WUS 210 transmissions sequentially during a WUS occasion 220, for PDCCH data 215 decoding and reception. UE 115-a may sequentially evaluate and decode the WUS 210 transmissions during the TTIs associated with each pre-configured transmit beam 205 and evaluate the signal quality of each pre-configured beam, in a hierarchical manner.

That is, UE 115-a may be pre-configured to monitor one or more transmit beams for WUSs 210. In some examples, UE 115-a may receive the beam-swept WUS 210 transmissions during some associated TTI duration(s) (e.g., symbol, slot) of each transmit beam. UE 115-a may evaluate and decode the WUS 210 transmissions over one or more pre-configured transmit beams of transmission, and evaluate the signal quality individually on the pre-configured beams, in a hierarchical manner. UE 115-*a* may detect one or more WUSs 210 of the beam sweep, and provide beam management feedback for each received WUS 210 via an UL resource configuration corresponding to each received WUS 210.

In some examples, UE 115-*a* and base station 105-*a* may assume that the most suitable beam (e.g., the WUS beam associated with a highest received signal power value that is reported by the UE 115-*a* via configured UL resources for WUS-based beam management feedback) may be used for subsequent PDCCH data 215 in a next on-duration 230 (e.g., in cases where the WUS(s) 210 received by UE 115-*a* includes a wake-up indication set to 1 for the UE 115-*a*). In some examples, in a case where the beam pre-configured for subsequent PDCCH data 215 in a next on-duration 230 is sufficient, UE 115-*a* may forgo WUS-based beam management feedback reporting.

Figure 3A:
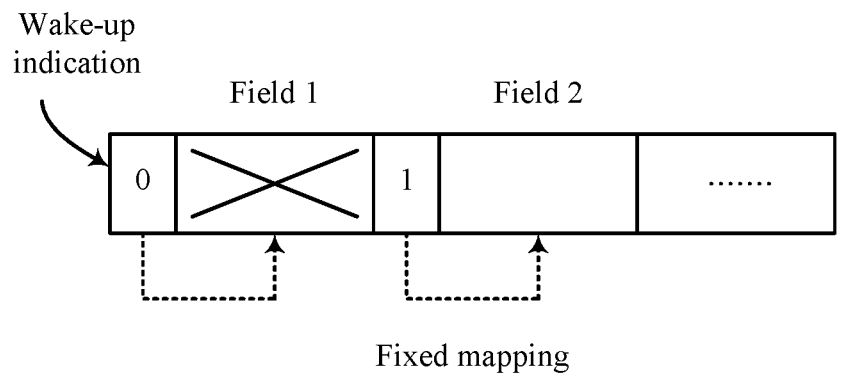
FIGS. 3A and 3B illustrate examples of wake-up signal (WUS) configurations that support DRX wake-up procedures with fast beam management in accordance with aspects of the present disclosure.
Figure 3B:
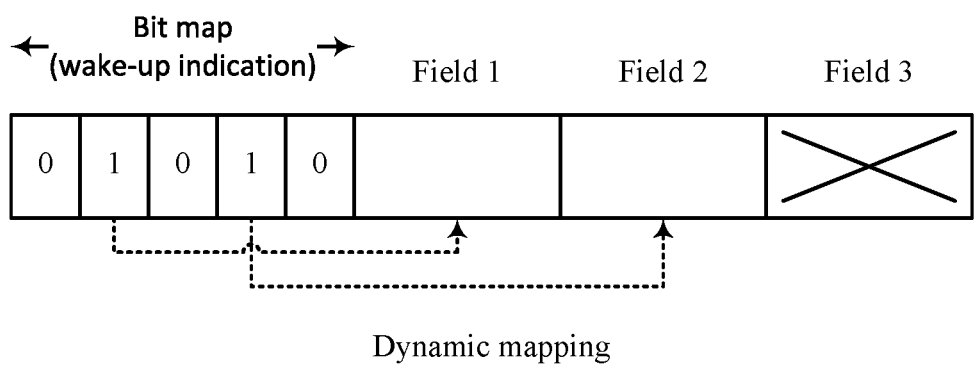

FIGS. 3A and 3B illustrate example WUS configuration 300 and example WUS configuration 301, respectively, that supports DRX wake-up procedures with fast beam management in accordance with aspects of the present disclosure. In some examples, WUS configuration 300 and WUS configuration 301 may implement aspects of wireless communications system 100 and/or wireless communications system 200. For example, a wake-up message may be configured according to WUS configuration 300 or WUS configuration 301, and the wake-up message may be transmitted, using different transmit beams in a beam sweeping manner, by a base station 105 to a UE 115.

As discussed herein, wireless communications systems may employ WUSs for improved power efficiency during C-DRX operation. Such WUSs may reduce occurrence of unnecessary wake-up during DRX operation (e.g., reduce occurrence of UE wake-up when no data is pending at the base station during a DRX on-duration). For example, using WUS techniques, a UE may monitor PDCCH during a DRX on-duration when a corresponding WUS is detected (e.g., otherwise, the DRX on-duration may be skipped and the UE may remain in a sleep state for power savings). As discussed herein (e.g., with reference to FIG. 2), PDCCH-based WUSs may be transmitted during a WUS occasion configured prior to an on-duration by some offset, or during an on-duration, in some cases.

PDCCH-based WUSs may be configured for a single UE or for a group of UEs. For each UE or each sub-group of UEs sharing a same PDCCH-based WUS, a wake-up indication field in DCI may be assigned to indicate whether the corresponding UE or sub-group of UEs is to wake-up to receive PDCCH data during an on-duration associated with the PDCCH-based WUS. If the wake-up indication (e.g., the wake-up indication field) is set to "1," the UE, or sub-group of UEs, associated with the wake-up indication may wake-up for the next DRX on-duration. Otherwise (e.g., if the wake-up indication is set to "0"), the UE, or sub-group of UEs, associated with the wake-up indication may skip the next DRX on-duration (e.g., and remain in a sleep state or low power state to conserve power).

For example, if at least one UE associated with PDCCH-based WUS has DL data in the buffer (e.g., to be served in the next on-duration), a base station may transmit a WUS with a wake-up indication field set to 1 for the corresponding UE. The base station may repeat the WUS with different transmit beams configured for WUS beam sweeping. Even when there is no DL data, the base station may still transmit WUSs with wake-up indication fields set to 0 (e.g., as such a "dummy" WUS may be used by UE at least for fast beam management procedures, even if the WUS does not wake-up the UE for a next on-duration, as the wake-up indication is set to 0).

WUS configuration 300 may illustrate a fixed mapping between wake-up indications and corresponding fields (e.g., information fields) of a WUS. For example, in WUS configuration 300, a wake-up indication may be followed by a field including wake-up information such as a bandwidth part (BWP), a number of carriers to be activated for the next on-duration, UL resources for corresponding beam feedback, etc. For example, in cases where UL resources for WUS-based beam feedback reporting are dynamically configured, the field associated with a wake-up indication may include information indicating such a corresponding UL resource configuration. WUS configuration 301 may illustrate a dynamic mapping between wake-up indications and corresponding fields (e.g., information fields) of a WUS. For example, WUS configuration 301 may include a bitmap of wake-up indications, and for each wake-up indication set to "1," a respective corresponding fields may follow the bitmap. In some example, WUS configuration 301 may be implemented in systems using semi-static (e.g., RRC) configuration of UL resources for WUS-based beam feedback (e.g., as UEs associated with a wake-up indication set to "0" may not decode additional information from a corresponding information field, as the UEs will not be woken up, but the UEs may still perform WUS-based beam feedback reporting based on the received WUSs and semi-statically configured UL resources for beam feedback reporting).

Figure 4:
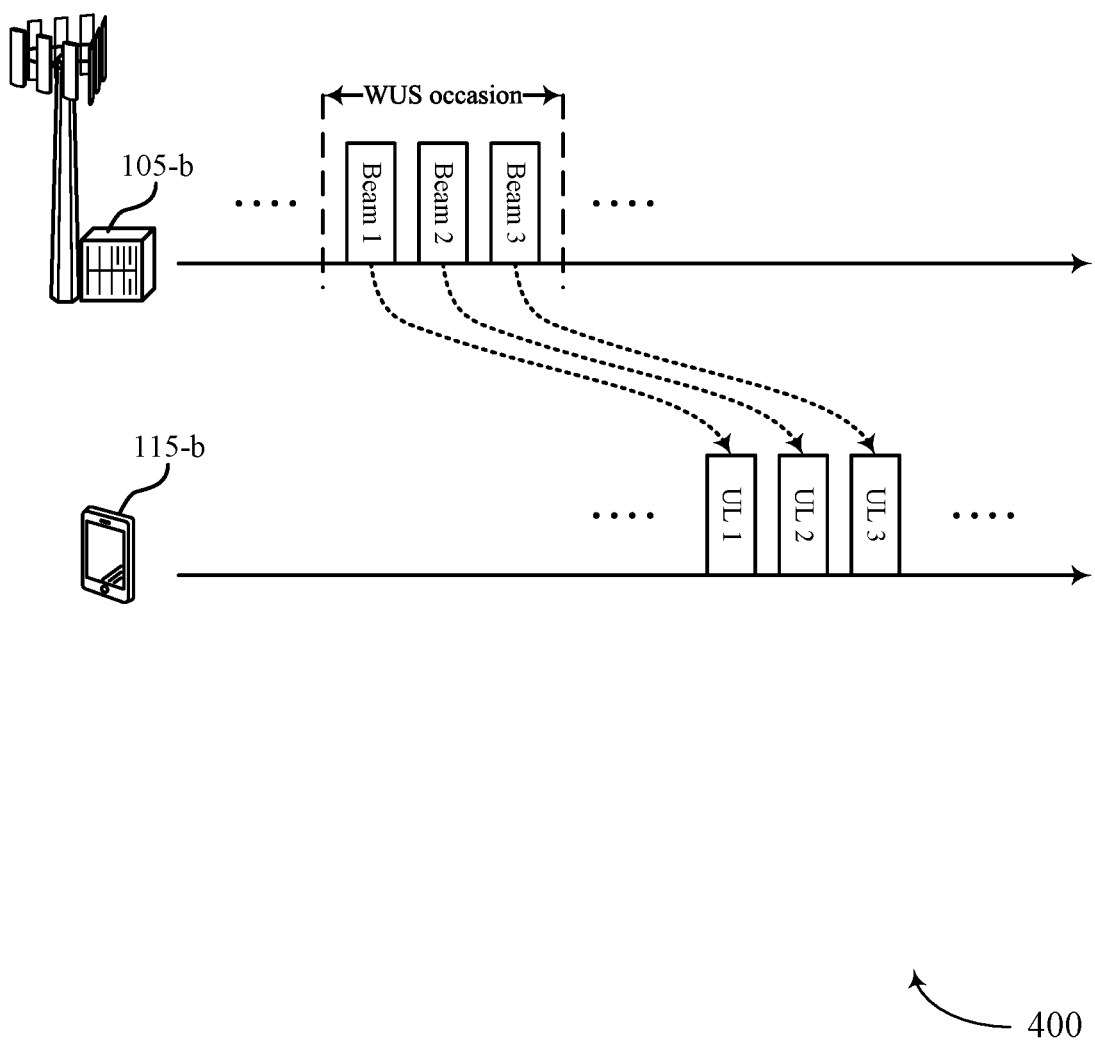
FIG. 4 illustrates an example timeline that supports DRX wake-up procedures with fast beam management in accordance with aspects of the present disclosure.

FIG. 4 illustrates an example of a timeline 400 that supports DRX wake-up procedures with fast beam management in accordance with aspects of the present disclosure. In some examples, timeline 400 may implement aspects of wireless communications system 100 and/or wireless communications system 200. For example, timeline 400 may illustrate base station 105-*b* transmission of a wake-up message (e.g., WUSs) via different transmit beams (e.g., "Beam 1," "Beam 2," and "Beam 3"), as well as correspondence between such WUSs and UL resources (e.g., "UL 1," "UL 2," and "UL 3") for WUS-based beam feedback reporting.

For example, timeline 400 may illustrate base station 105-*b* transmitting a wake-up message during a WUS occasion via three WUSs transmitted using "Beam 1," "Beam 2," and "Beam 3," respectively. Each WUS or each beam may correspond to an UL resource for beam feedback reporting. For example, in scenarios where UE 115-*b* receives the wake-up message over "Beam 1" and "Beam 3," the UE 115-*b* may transmit beam feedback corresponding to "Beam 1" using "UL 1" resources and may transmit beam feedback corresponding to "Beam 3" using "UL 3" resources. As described herein, the correspondence between the wake-up message and the UL resources (e.g., the correspondence between the wake-up message transmitted using "Beam 3" and "UL 3" resources) may be semi-statically configured (e.g., via RRC signaling) and/or may be dynamically configured (e.g., via information in a field corresponding to the wake-up indication included in the WUS transmitted using "Beam 3"). For example, UE 115-*b* may be configured with UE-specific UL resources (e.g., UE-specific time resources, frequency resources, code sequences, etc.) for each of "Beam 1," "Beam 2," and "Beam 3." In other examples, UE 115-*b* may be configured with a single UE-specific UL resource (e.g., or some combination of UL resources) for "Beam 1," "Beam 2," and "Beam 3." In such examples, UE 115-*b* may transmit beam feedback reporting over the UL resource, and the beam feedback reporting may include indices of received beams corresponding to feedback included in the report.

Figure 5:
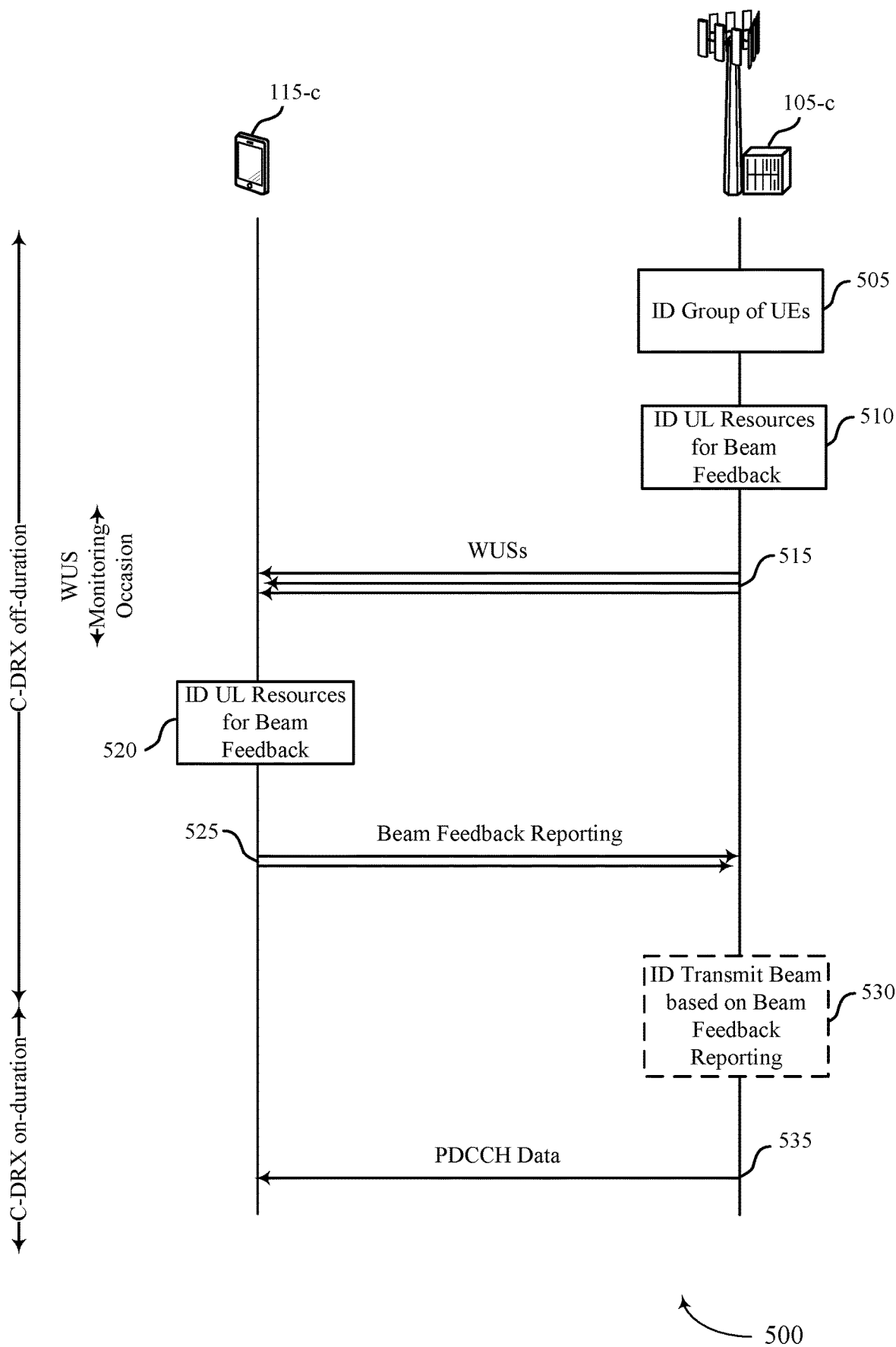
FIG. 5 illustrates an example of a process flow that supports DRX wake-up procedures with fast beam management in accordance with aspects of the present disclosure.

FIG. 5 illustrates an example of a process flow 500 that supports DRX wake-up procedures with fast beam management in accordance with aspects of the present disclosure. In some examples, process flow 500 may implement aspects of wireless communications system 100 and/or wireless communications system 200. Process flow 500 may be implemented by a UE 115-c and a base station 105-c, which may be examples of a UE 115 and a base station 105 described with reference to FIGS. 1-4. In the following description of the process flow 500, the operations between UE 115-c and base station 105-c may be transmitted in a different order than the order shown, or the operations performed by base station 105-c and UE 115-c may be performed in different orders or at different times. Certain operations may also be left out of the process flow 500, or other operations may be added to the process flow 500. It is to be understood that while base station 105-c and UE 115-c are shown performing a number of the operations of process flow 500, any wireless device may perform the operations shown.

At 505, base station 105-c may identify a group of UEs (e.g., which may include UE 115-c) associated with a set of transmit beams, the group of UEs operating according to DRX in a connected mode (e.g., a C-DRX mode). For example, base station 105-c may identify a group of UEs based on their geographic location relative to the base station 105-c. The base station 105-c may configure the group of UEs with one or more WUS occasions and one or more DRX on-durations (e.g., which may refer to a single DRX on-duration, two or more different DRX on-durations close to each other, etc.). As such, the base station 105-c may configure a same set of transmit beams (e.g., transmit beams for WUS beam sweeping) for the identified group of UEs. That is, each UE of the identified group of UEs may be associated with at least a subset of the set of transmit beams configured for the group of UEs.

At 510, base station 105-c may identify UL resources for WUS-based beam feedback reporting techniques. In some cases, 510 may occur prior to 505 and base station 105-a may semi-statically configure UE 115-c with an UL resource configuration for various WUS beams.

At 515, base station 105-c may transmit a set of wake-up messages during a WUS occasion prior to or during DRX on-durations associated with the group of UEs, wherein each wake-up message of the set of wake-up messages (e.g., each WUS including the wake-up message) may be transmitted using a different transmit beam of the set of transmit beams. In the example of FIG. 5, three WUSs (e.g., a wake-up message transmitted using three beams) may be transmitted, however the described techniques may apply to any number of transmitted WUSs by analogy, without departing from the scope of the present disclosure.

At 515 (e.g., during a WUS occasion), UE 115-c may receive one or more of the WUSs transmitted by base station 105-c. In the example of FIG. 5, two WUSs (e.g., a wake-up message transmitted using three beams) may be received, however the described techniques may apply to any number of WUSs received by a UE by analogy, without departing from the scope of the present disclosure.

At 520, based on the received WUSs, UE 115-c may identify UL resources corresponding to one or more of the received WUSs, for example subsequent to the WUS occasions (e.g., prior to or during the DRX on-duration). For example, UE 115-c may identify a correspondence between the wake-up message (e.g., each received WUS) and UL resources based on the received wake-up message (e.g., each received WUS may include a field dynamically indicating an UL resource for beam feedback corresponding to the respective WUS). In other example, base station 105-c may have semi-statically configured UL resources for the wake-up message, and the UE 115-c may identify UL resources to use for beam feedback based on which WUSs were received (e.g., which TTIs or beams were used to successfully receive the wake-up message) and the configuration of UL resource correspondence.

At 525, UE 115-c may transmit, using the UL resources identified at 520, a beam report for the one or more configured beam pairs based on the wake-up message. In the example of FIG. 5, if two WUSs are received (e.g., if the wake-up message is received over two beam pairs), UE 115-c may transmit beam feedback reporting for each of the two instances of the received wake-up message using UL resources corresponding to each instance (e.g., using UL resources corresponding to each beam pair used to receive the wake-up message). For example, in some cases, UE 115-c may transmit an acknowledgement for the each received wake-up message instance using corresponding UL resources. In some cases, UE 115-c may transmit a received signal power (e.g., reference signal received power (RSRP)) value for the each received wake-up message instance using corresponding UL resources. In some cases, the UL resources used for beam feedback reporting may refer to distinct UL resources for each received WUS, or may refer to a single UL resource corresponding to the plurality of received WUSs (e.g., and the beam report transmitted over the single UL resource may include an index, an acknowledgment, a quality parameter (e.g., a received signal power value), or some combination thereof, for each received WUS).

At 530, base station 105-c may, in some cases, identify a beam for PDCCH data during a DRX on-duration based on the beam feedback reporting received at 525. For example, when a beam report from the UE 115-c indicates a suitable beam other than a beam pre-configured for PDCCH data transmission, the UE 115-c and base station 105-c may assume the suitable beam (e.g., the best or most suitable beam, as indicated by the beam feedback reporting) is to be used for PDCCH data during a DRX on-duration. In some cases, if a beam pre-configured for PDCCH data transmission is indicated as suitable in the beam feedback reporting, the pre-configured beam for PDCCH data transmission may be maintained (e.g., may still be used for PDCCH data transmission during the DRX on-duration).

At 535, base station 105-c may transmit PDCCH data during the DRX on-duration (e.g., in cases where the wake-up message includes a wake-up indication for the UE 115-c). The UE 115-c may monitor for the PDCCH during the DRX on-duration using the pre-configured beam for PDCCH or using a new beam indicated in the beam feedback reporting, as described herein. For example, in some cases, UE 115-c may monitor the PDCCH by monitoring a CORESET of a plurality of CORESETs based on identifying a suitable beam pair from received WUSs.

In the discussion of the techniques described herein, a wake-up message may, in some cases, refer to a plurality of wake-up messages (e.g., a wake-up message may generally refer to wake-up information, which may be transmitted by a base station as one or more WUSs via different beams). Further, a beam may generally refer to a transmit beam, a receive beam, or a beam pair used for beamformed communications.

Figure 6:
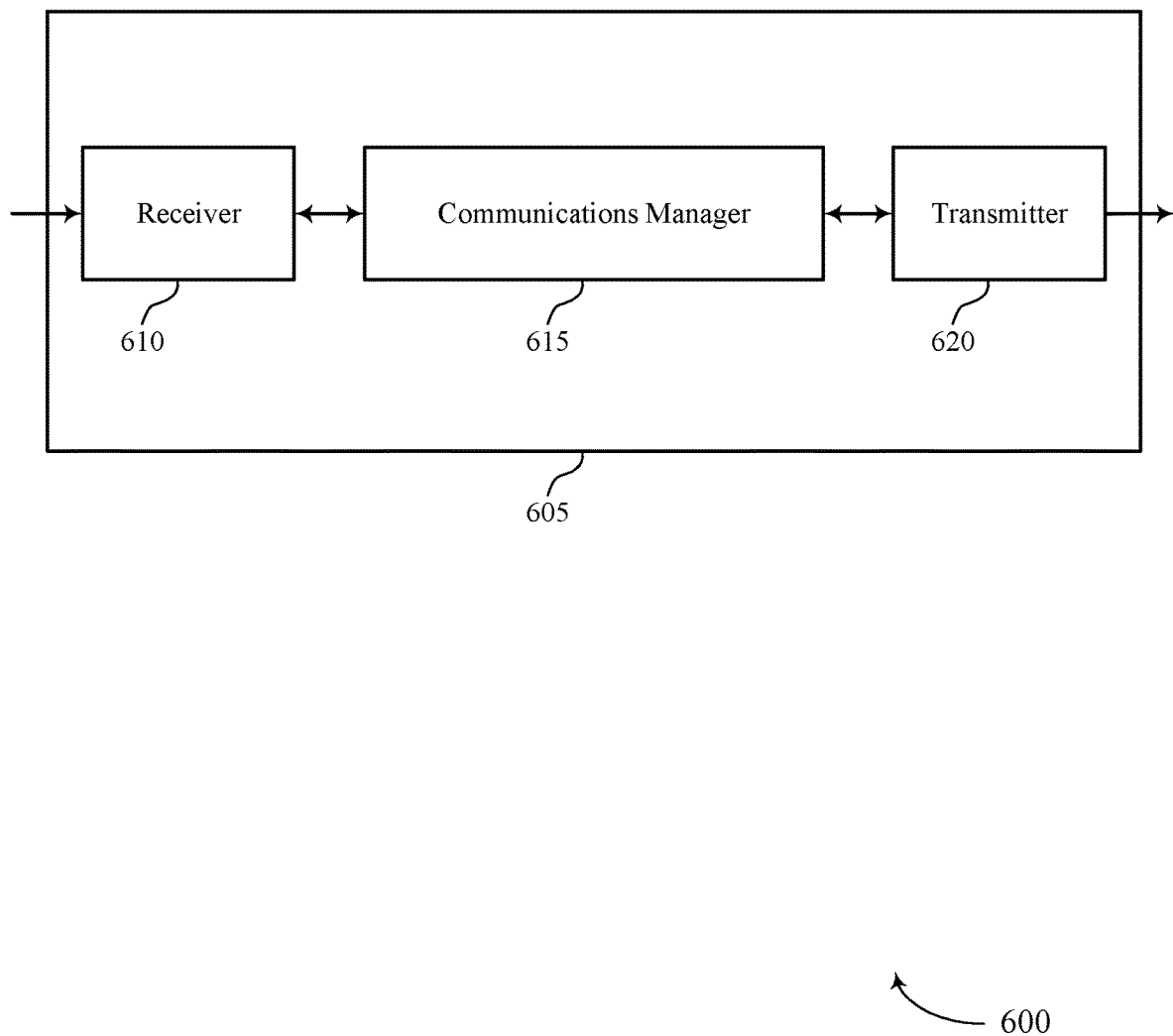
FIGS. 6 and 7 show block diagrams of devices that support DRX wake-up procedures with fast beam management in accordance with aspects of the present disclosure.

FIG. 6 shows a block diagram 600 of a device 605 that supports DRX wake-up procedures with fast beam management in accordance with aspects of the present disclosure. The device 605 may be an example of aspects of a UE 115 as described herein. The device 605 may include a receiver 610, a communications manager 615, and a transmitter 620. The device 605 may also include a processor. Each of these components may be in communication with one another (e.g., via one or more buses).

The receiver 610 may receive information such as packets, user data, or control information associated with various information channels (e.g., control channels, data channels, and information related to DRX wake-up procedures with fast beam management, etc.). Information may be passed on to other components of the device 605. The receiver 610 may be an example of aspects of the transceiver 920 described with reference to FIG. 9. The receiver 610 may utilize a single antenna or a set of antennas.

The communications manager 615 may monitor, in a connected mode during discontinuous reception operation, a wake-up signal (WUS) occasion using receive beams corresponding to one or more configured beam pairs, the wake-up signal occasion occurring prior to or within a discontinuous reception on-duration, detect a wake-up message based on the monitoring, identify, based on the wake-up message, uplink (UL) resources prior to or within the discontinuous reception on-duration, and transmit, using the uplink resources, a beam report for the one or more configured beam pairs based on the wake-up message. The communications manager 615 may be an example of aspects of the communications manager 910 described herein.

The communications manager 615, or its sub-components, may be implemented in hardware, code (e.g., software or firmware) executed by a processor, or any combination thereof. If implemented in code executed by a processor, the functions of the communications manager 615, or its sub-components may be executed by a general-purpose processor, a digital signal processor (DSP), an application-specific integrated circuit (ASIC), a FPGA or other programmable logic device, discrete gate or transistor logic, discrete hardware components, or any combination thereof designed to perform the functions described in the present disclosure.

The communications manager 615, or its sub-components, may be physically located at various positions, including being distributed such that portions of functions are implemented at different physical locations by one or more physical components. In some examples, the communications manager 615, or its sub-components, may be a separate and distinct component in accordance with various aspects of the present disclosure. In some examples, the communications manager 615, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

In some examples, communications manager 615 may be implemented as an integrated circuit or chipset for a mobile device modem, and the receiver 610 and transmitter 620 may be implemented as analog components (for example, amplifiers, filters, antennas, etc.) coupled with the mobile device modem to enable wireless transmission and reception.

The communications manager 615 as described herein may be implemented to realize one or more potential advantages. Various implementations may reduce latency associated with beam management for wake-up signaling. At least some implementations may enable the communications manager 615 to receive beam-swept WUSs during one or more WUS monitoring occasions. At least some implementations may enable communications manager 615 to generate feedback information for one or more WUS beams and transmit the feedback information to the base station.

Based on implementing the latency reduction techniques as described herein, one or more processors of the device 605 (for example, processor(s) controlling or incorporated with one or more of receiver 610, communications manager 615, and transmitter 620) may improve communications efficiency and reduce power consumption. For example, a base station may transmit WUSs in a beam sweeping manner, and a UE may respond with feedback for each received WUS beam. The UE and base station may thus efficiently identify one or more beams of sufficient quality, which may enable the UE to avoid latency and increased power consumption associated with performing beam management during a DRX-on duration.

The transmitter 620 may transmit signals generated by other components of the device 605. In some examples, the transmitter 620 may be collocated with a receiver 610 in a transceiver module. For example, the transmitter 620 may be an example of aspects of the transceiver 920 described with reference to FIG. 9. The transmitter 620 may utilize a single antenna or a set of antennas.

Figure 7:
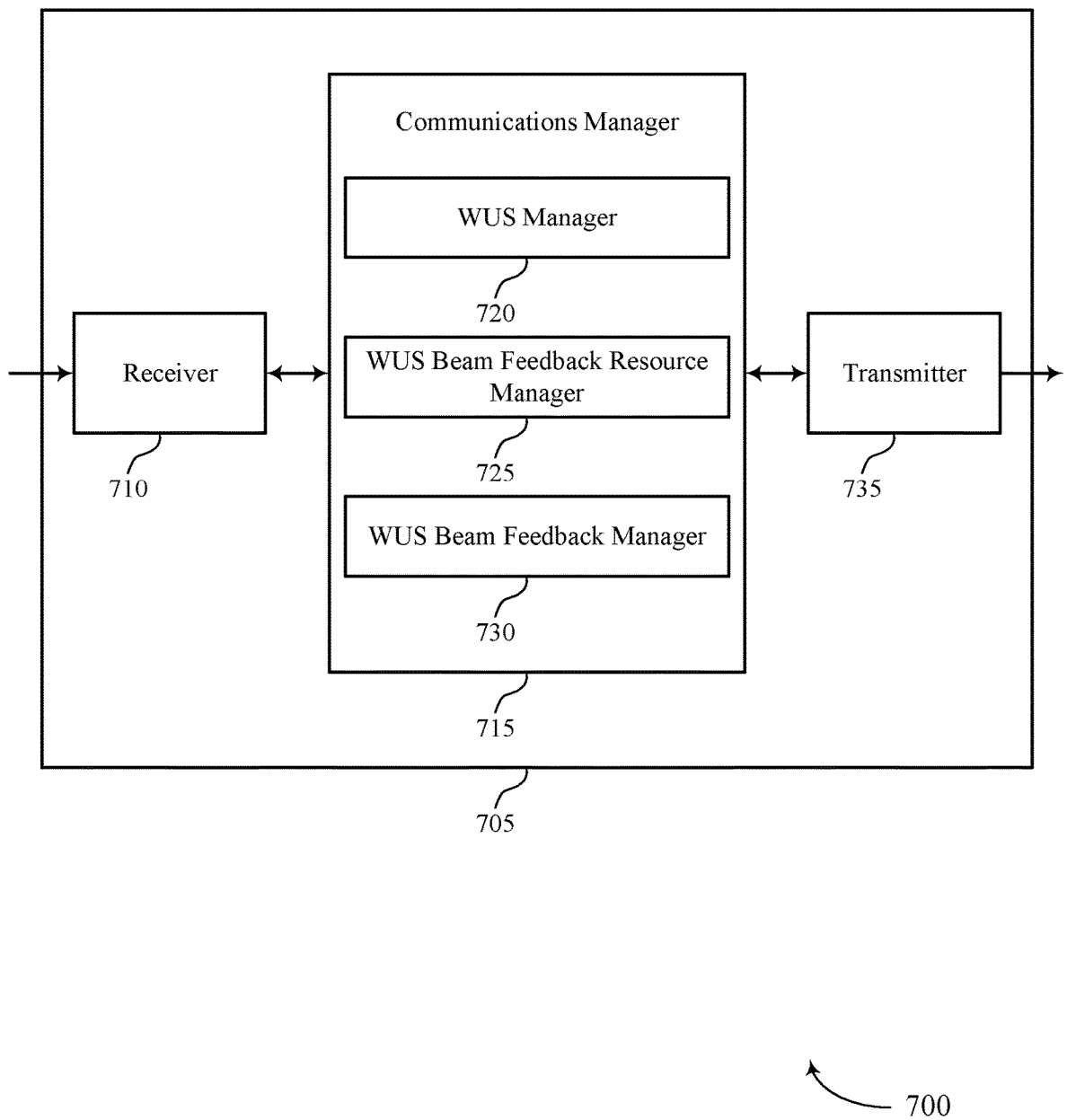

FIG. 7 shows a block diagram 700 of a device 705 that supports DRX wake-up procedures with fast beam management in accordance with aspects of the present disclosure. The device 705 may be an example of aspects of a device 605, or a UE 115 as described herein. The device 705 may include a receiver 710, a communications manager 715, and a transmitter 735. The device 705 may also include a processor. Each of these components may be in communication with one another (e.g., via one or more buses).

The receiver 710 may receive information such as packets, user data, or control information associated with various information channels (e.g., control channels, data channels, and information related to DRX wake-up procedures with fast beam management, etc.). Information may be passed on to other components of the device 705. The receiver 710 may be an example of aspects of the transceiver 920 described with reference to FIG. 9. The receiver 710 may utilize a single antenna or a set of antennas.

The communications manager 715 may be an example of aspects of the communications manager 615 as described herein. The communications manager 715 may include a WUS manager 720, a WUS beam feedback resource manager 725, and a WUS beam feedback manager 730. The communications manager 715 may be an example of aspects of the communications manager 910 described herein.

The WUS manager 720 may monitor, in a connected mode during discontinuous reception operation, a wake-up signal occasion using receive beams corresponding to one or more configured beam pairs, the wake-up signal occasion occurring prior to or within a discontinuous reception on-duration and detect a wake-up message based on the monitoring. The WUS beam feedback resource manager 725 may identify, based on the wake-up message, uplink resources prior to or within the discontinuous reception on-duration. The WUS beam feedback manager 730 may transmit, using the uplink resources, a beam report for the one or more configured beam pairs based on the wake-up message.

The transmitter 735 may transmit signals generated by other components of the device 705. In some examples, the transmitter 735 may be collocated with a receiver 710 in a transceiver module. For example, the transmitter 735 may be an example of aspects of the transceiver 920 described with reference to FIG. 9. The transmitter 735 may utilize a single antenna or a set of antennas.

Figure 8:
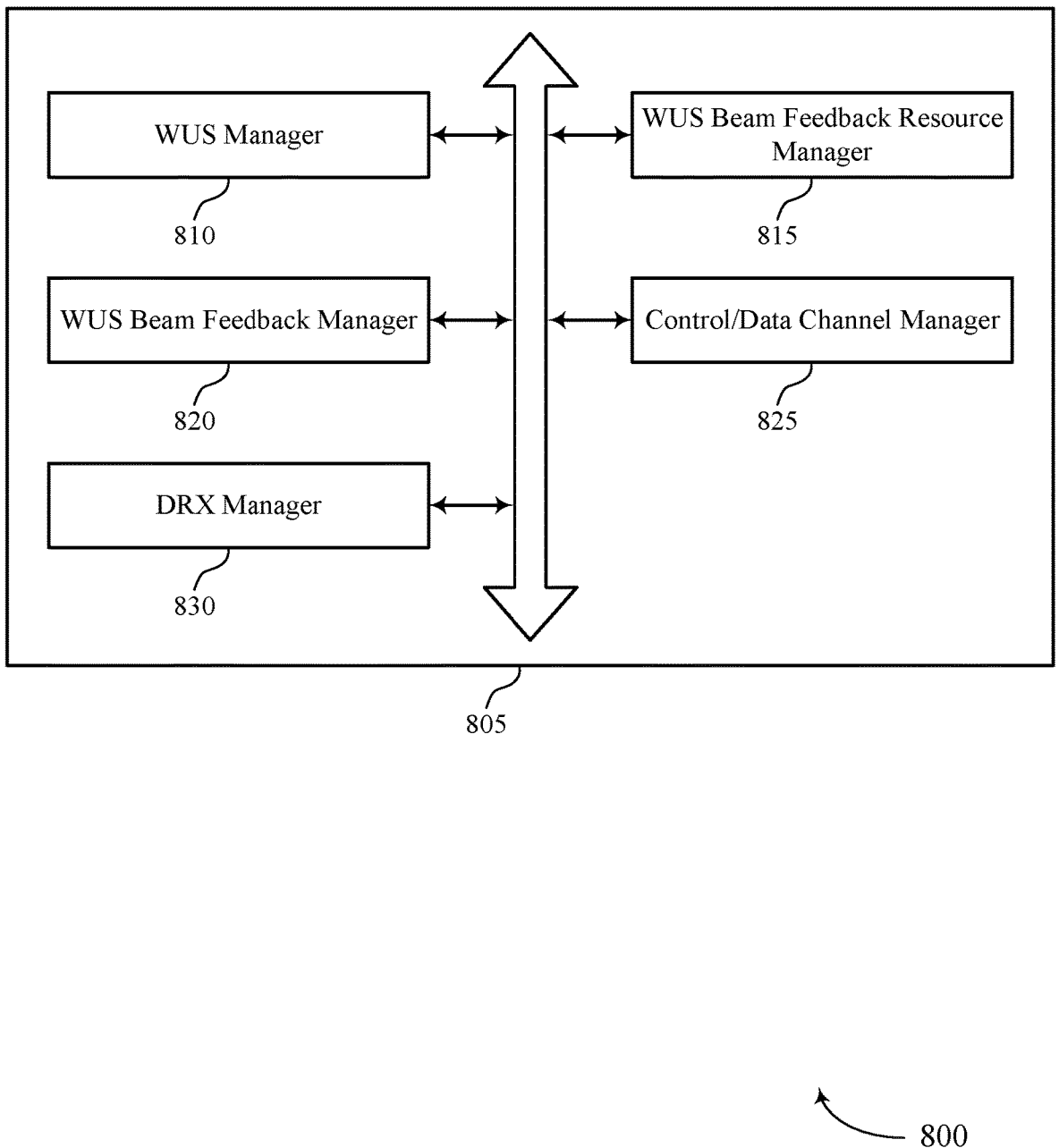
FIG. 8 shows a block diagram of a communications manager that supports DRX wake-up procedures with fast beam management in accordance with aspects of the present disclosure.

FIG. 8 shows a block diagram 800 of a communications manager 805 that supports DRX wake-up procedures with fast beam management in accordance with aspects of the present disclosure. The communications manager 805 may be an example of aspects of a communications manager 615, a communications manager 715, or a communications manager 910 described herein. The communications manager 805 may include a WUS manager 810, a WUS beam feedback resource manager 815, a WUS beam feedback manager 820, a control/data channel manager 825, and a DRX manager 830. Each of these modules may communicate, directly or indirectly, with one another (e.g., via one or more buses).

The WUS manager 810 may monitor, in a connected mode during discontinuous reception operation, a wake-up signal occasion using receive beams corresponding to one or more configured beam pairs, the wake-up signal occasion occurring prior to or within a discontinuous reception on-duration. In some examples, the WUS manager 810 may detect a wake-up message based on the monitoring. In some cases, the wake-up message includes a set of wake-up messages and the uplink resources includes a set of uplink resources, each of the set of uplink resources corresponding to one wake-up message of the set of wake-up messages. In some cases, the wake-up message includes a set of wake-up messages and the uplink resources include a single uplink resource corresponding to the set of wake-up messages.

The WUS beam feedback resource manager 815 may identify, based on the wake-up message, uplink resources prior to or within the discontinuous reception on-duration. In some examples, the WUS beam feedback resource manager 815 may receive an indication of a correspondence between the wake-up message and the uplink resources. In some aspects, the WUS beam feedback resource manager 815 may identify a correspondence between the wake-up message and the uplink resources based on the received wake-up message.

The WUS beam feedback manager 820 may transmit, using the uplink resources, a beam report for the one or more configured beam pairs based on the wake-up message. In some examples, the WUS beam feedback manager 820 may transmit an acknowledgement for the received wake-up message using the uplink resources. In some cases, the WUS beam feedback manager 820 may transmit a received signal power value for the received wake-up message using the uplink resources. In some examples, the WUS beam feedback manager 820 may transmit an index associated with the received wake-up message. In some cases, the WUS beam feedback manager 820 may identify a first beam pair of the one or more configured beam pairs based on the wake-up message.

The control/data channel manager 825 may monitor a PDCCH during the discontinuous reception on-duration based on the wake-up message including a wake-up indication for the UE. In some examples, the control/data channel manager 825 may receive a downlink control channel transmission based on the monitoring. In some examples, the control/data channel manager 825 may monitor a PDCCH during the discontinuous reception on-duration using the first beam pair based on an indication associated with the first beam pair in the beam report. The WUS beam feedback manager 820 may generate the beam report based at least in part on an indication associated with the first beam pair, and the control/data channel manager 825 may receive a physical downlink data channel scheduled by the PDCCH using the first beam pair based at least in part on the generated beam report. In some cases, monitoring the PDCCH includes monitoring a first control resource set of a set of control resource sets based on identifying the first beam pair. In some examples, monitoring the PDCCH includes monitoring a first control resource set configured for a second beam pair according to the first beam pair based on identifying the first beam pair.

The DRX manager 830 may determine to remain in a power-saving state (e.g., a sleep state, a sleep mode, a DRX off state, etc.) during the discontinuous reception on-duration based on the wake-up message including an indication that mobile terminated data is not present for the UE.

Figure 9:
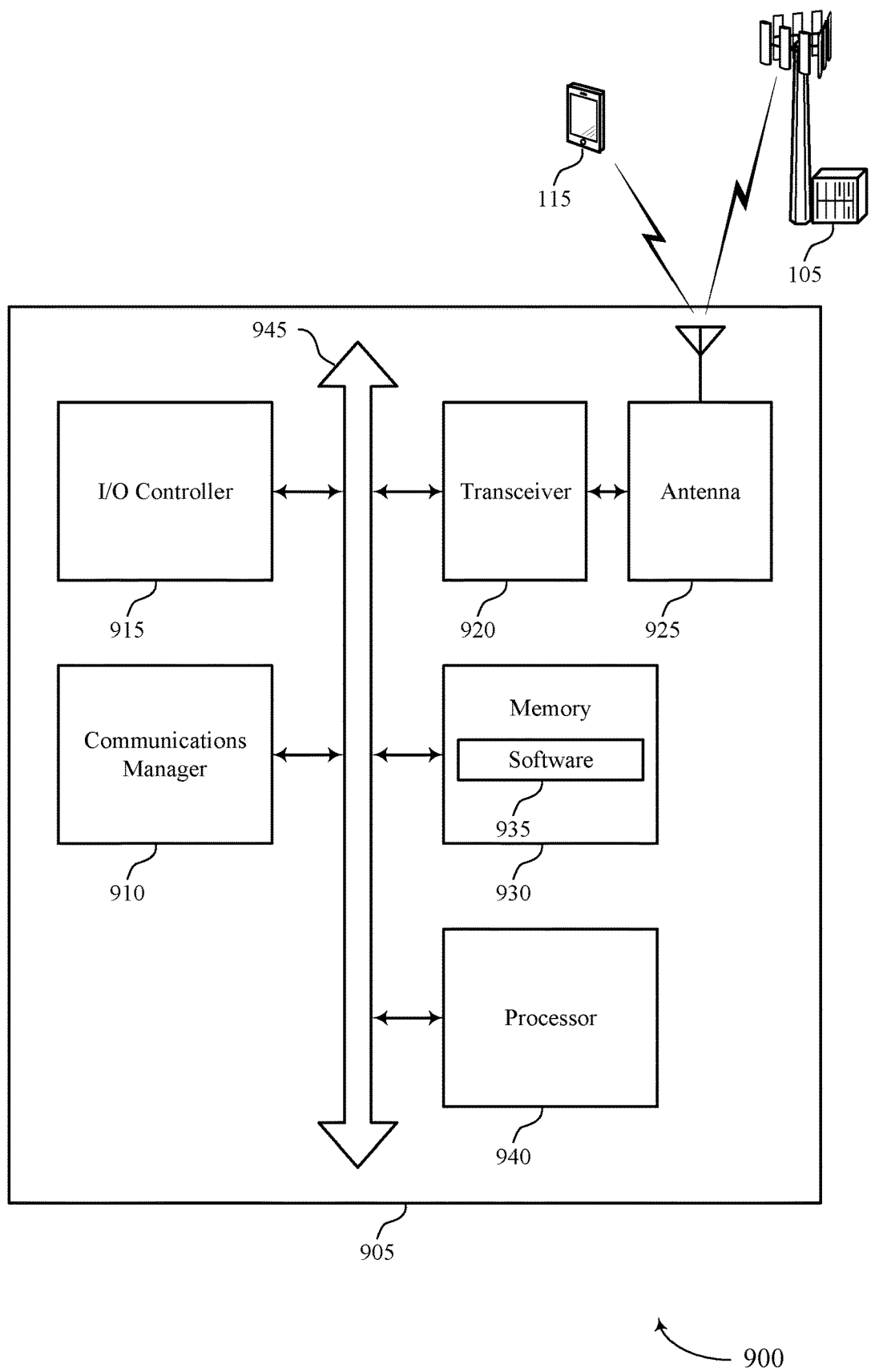
FIG. 9 shows a diagram of a system including a device that supports DRX wake-up procedures with fast beam management in accordance with aspects of the present disclosure.

FIG. 9 shows a diagram of a system 900 including a device 905 that supports DRX wake-up procedures with fast beam management in accordance with aspects of the present disclosure. The device 905 may be an example of or include the components of device 605, device 705, or a UE 115 as described herein. The device 905 may include components for bi-directional voice and data communications including components for transmitting and receiving communications, including a communications manager 910, an I/O controller 915, a transceiver 920, an antenna 925, memory 930, and a processor 940. These components may be in electronic communication via one or more buses (e.g., bus 945).

The communications manager 910 may monitor, in a connected mode during discontinuous reception operation, a wake-up signal occasion using receive beams corresponding to one or more configured beam pairs, the wake-up signal occasion occurring prior to or within a discontinuous reception on-duration, detect a wake-up message based on the monitoring, identify, based on the wake-up message, uplink resources prior to or within the discontinuous reception on-duration, and transmit, using the uplink resources, a beam report for the one or more configured beam pairs based on the wake-up message.

The I/O controller 915 may manage input and output signals for the device 905. The I/O controller 915 may also manage peripherals not integrated into the device 905. In some cases, the I/O controller 915 may represent a physical connection or port to an external peripheral. In some cases, the I/O controller 915 may utilize an operating system such as iOS®, ANDROID®, MS-DOS®, MS-WINDOWS®, OS/2®, UNIX®, LINUX®, or another known operating system. In other cases, the I/O controller 915 may represent or interact with a modem, a keyboard, a mouse, a touchscreen, or a similar device. In some cases, the I/O controller 915 may be implemented as part of a processor. In some cases, a user may interact with the device 905 via the I/O controller 915 or via hardware components controlled by the I/O controller 915.

The transceiver 920 may communicate bi-directionally, via one or more antennas, wired, or wireless links as described above. For example, the transceiver 920 may represent a wireless transceiver and may communicate bi-directionally with another wireless transceiver. The transceiver 920 may also include a modem to modulate the packets and provide the modulated packets to the antennas for transmission, and to demodulate packets received from the antennas.

In some cases, the wireless device may include a single antenna 925. However, in some cases the device may have more than one antenna 925, which may be capable of concurrently transmitting or receiving multiple wireless transmissions.

The memory 930 may include RAM and ROM. The memory 930 may store computer-readable, computer-executable code or software 935 including instructions that, when executed, cause the processor to perform various functions described herein. In some cases, the memory 930 may contain, among other things, a BIOS which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In other cases, a memory controller may be integrated into the processor 940. The processor 940 may be configured to execute computer-readable instructions stored in a memory (e.g., the memory 930) to cause the device 905 to perform various functions (e.g., functions or tasks supporting DRX wake-up procedures with fast beam management).

The software 935 may include instructions to implement aspects of the present disclosure, including instructions to support wireless communications. The software 935 may be stored in a non-transitory computer-readable medium such as system memory or other type of memory. In some cases, the software 935 may not be directly executable by the processor 940 but may cause a computer (e.g., when compiled and executed) to perform functions described herein.

Figure 10:
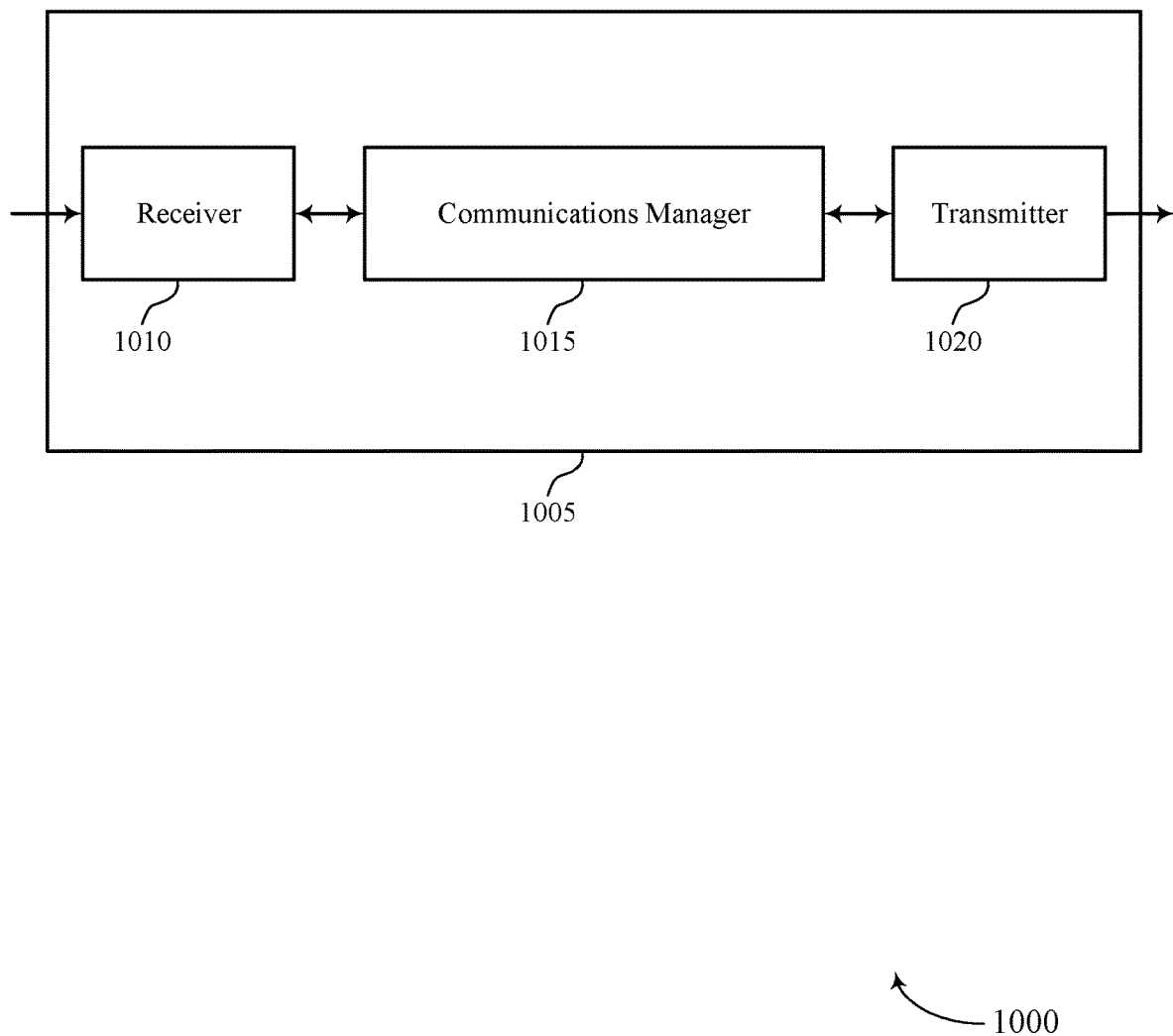
FIGS. 10 and 11 show block diagrams of devices that support DRX wake-up procedures with fast beam management in accordance with aspects of the present disclosure.

FIG. 10 shows a block diagram 1000 of a device 1005 that supports DRX wake-up procedures with fast beam management in accordance with aspects of the present disclosure. The device 1005 may be an example of aspects of a base station 105 as described herein. The device 1005 may include a receiver 1010, a communications manager 1015, and a transmitter 1020. The device 1005 may also include a processor. Each of these components may be in communication with one another (e.g., via one or more buses).

The receiver 1010 may receive information such as packets, user data, or control information associated with various information channels (e.g., control channels, data channels, and information related to DRX wake-up procedures with fast beam management, etc.). Information may be passed on to other components of the device 1005. The receiver 1010 may be an example of aspects of the transceiver 1320 described with reference to FIG. 13. The receiver 1010 may utilize a single antenna or a set of antennas.

The communications manager 1015 may identify a group of UEs associated with a set of transmit beams, the group of UEs operating according to discontinuous reception in a connected mode, transmit a set of wake-up messages during a wake-up signal occasion prior to or within discontinuous reception on-durations associated with the group of UEs, where each wake-up message of the set of wake-up messages is transmitted using a different transmit beam of the set of transmit beams, identify uplink resources corresponding to the set of wake-up messages, and receive a beam report from at least one of the group of UEs over the uplink resources based on the transmitted set of wake-up messages. The communications manager 1015 may be an example of aspects of the communications manager 1310 described herein.

The communications manager 1015, or its sub-components, may be implemented in hardware, code (e.g., software or firmware) executed by a processor, or any combination thereof. If implemented in code executed by a processor, the functions of the communications manager 1015, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1015, or its sub-components, may be physically located at various positions, including being distributed such that portions of functions are implemented at different physical locations by one or more physical components. In some examples, the communications manager 1015, or its sub-components, may be a separate and distinct component in accordance with various aspects of the present disclosure. In some examples, the communications manager 1015, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1020 may transmit signals generated by other components of the device 1005. In some examples, the transmitter 1020 may be collocated with a receiver 1010 in a transceiver module. For example, the transmitter 1020 may be an example of aspects of the transceiver 1320 described with reference to FIG. 13. The transmitter 1020 may utilize a single antenna or a set of antennas.

Figure 11:
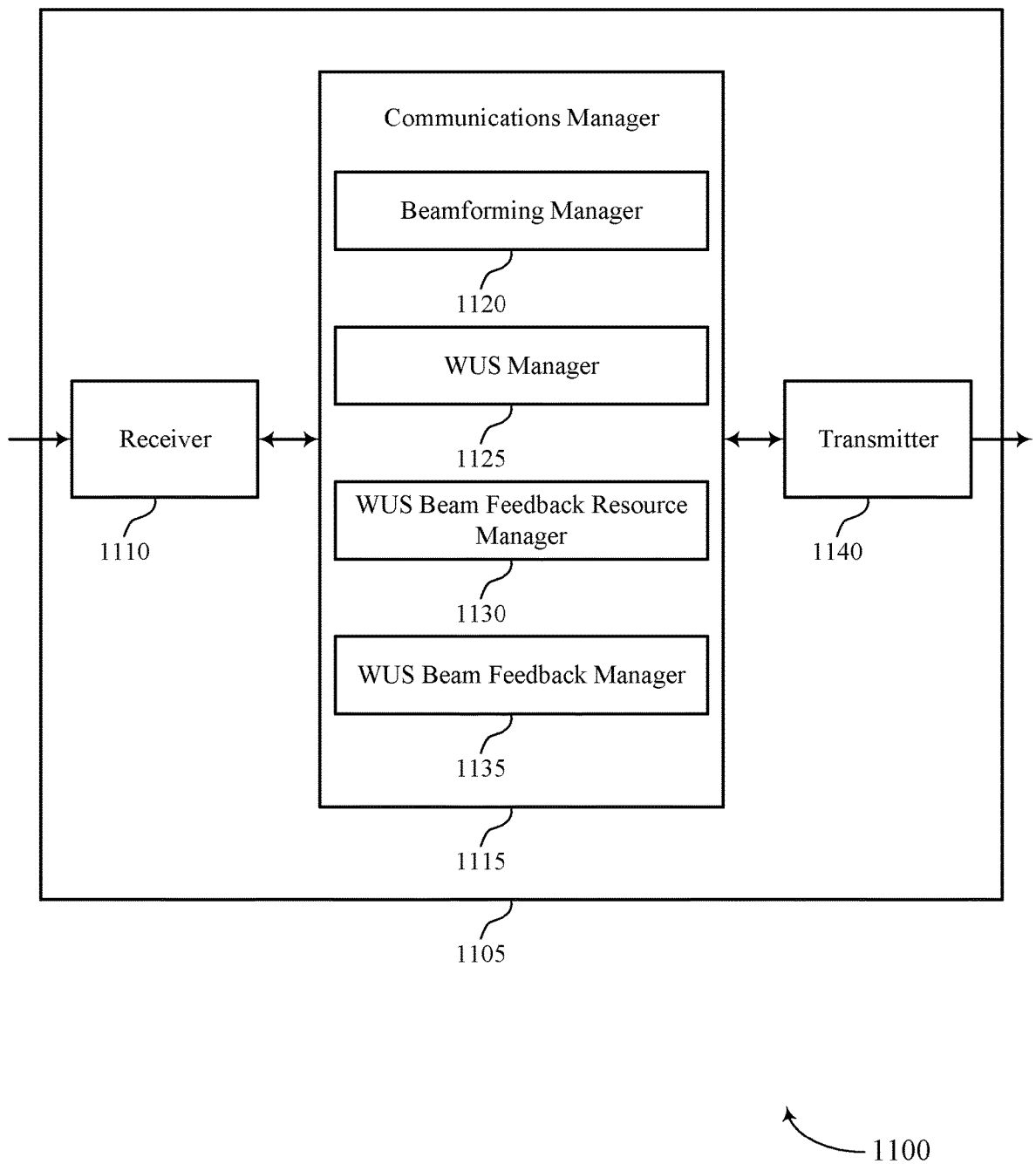

FIG. 11 shows a block diagram 1100 of a device 1105 that supports DRX wake-up procedures with fast beam management in accordance with aspects of the present disclosure. The device 1105 may be an example of aspects of a device 1005, or a base station 105 as described herein. The device 1105 may include a receiver 1110, a communications manager 1115, and a transmitter 1140. The device 1105 may also include a processor. Each of these components may be in communication with one another (e.g., via one or more buses).

The receiver 1110 may receive information such as packets, user data, or control information associated with various information channels (e.g., control channels, data channels, and information related to DRX wake-up procedures with fast beam management, etc.). Information may be passed on to other components of the device 1105. The receiver 1110 may be an example of aspects of the transceiver 1320 described with reference to FIG. 13. The receiver 1110 may utilize a single antenna or a set of antennas.

The communications manager 1115 may be an example of aspects of the communications manager 1015 as described herein. The communications manager 1115 may include a beamforming manager 1120, a WUS manager 1125, a WUS beam feedback resource manager 1130, and a WUS beam feedback manager 1135. The communications manager 1115 may be an example of aspects of the communications manager 1310 described herein.

The beamforming manager 1120 may identify a group of UEs associated with a set of transmit beams, the group of UEs operating according to discontinuous reception in a connected mode. The WUS manager 1125 may transmit a set of wake-up messages during a wake-up signal occasion prior to or within discontinuous reception on-durations associated with the group of UEs, where each wake-up message of the set of wake-up messages is transmitted using a different transmit beam of the set of transmit beams. The WUS beam feedback resource manager 1130 may identify uplink resources corresponding to the set of wake-up messages. The WUS beam feedback manager 1135 may receive a beam report from at least one of the group of UEs over the uplink resources based on the transmitted set of wake-up messages.

The transmitter 1140 may transmit signals generated by other components of the device 1105. In some examples, the transmitter 1140 may be collocated with a receiver 1110 in a transceiver module. For example, the transmitter 1140 may be an example of aspects of the transceiver 1320 described with reference to FIG. 13. The transmitter 1140 may utilize a single antenna or a set of antennas.

Figure 12:
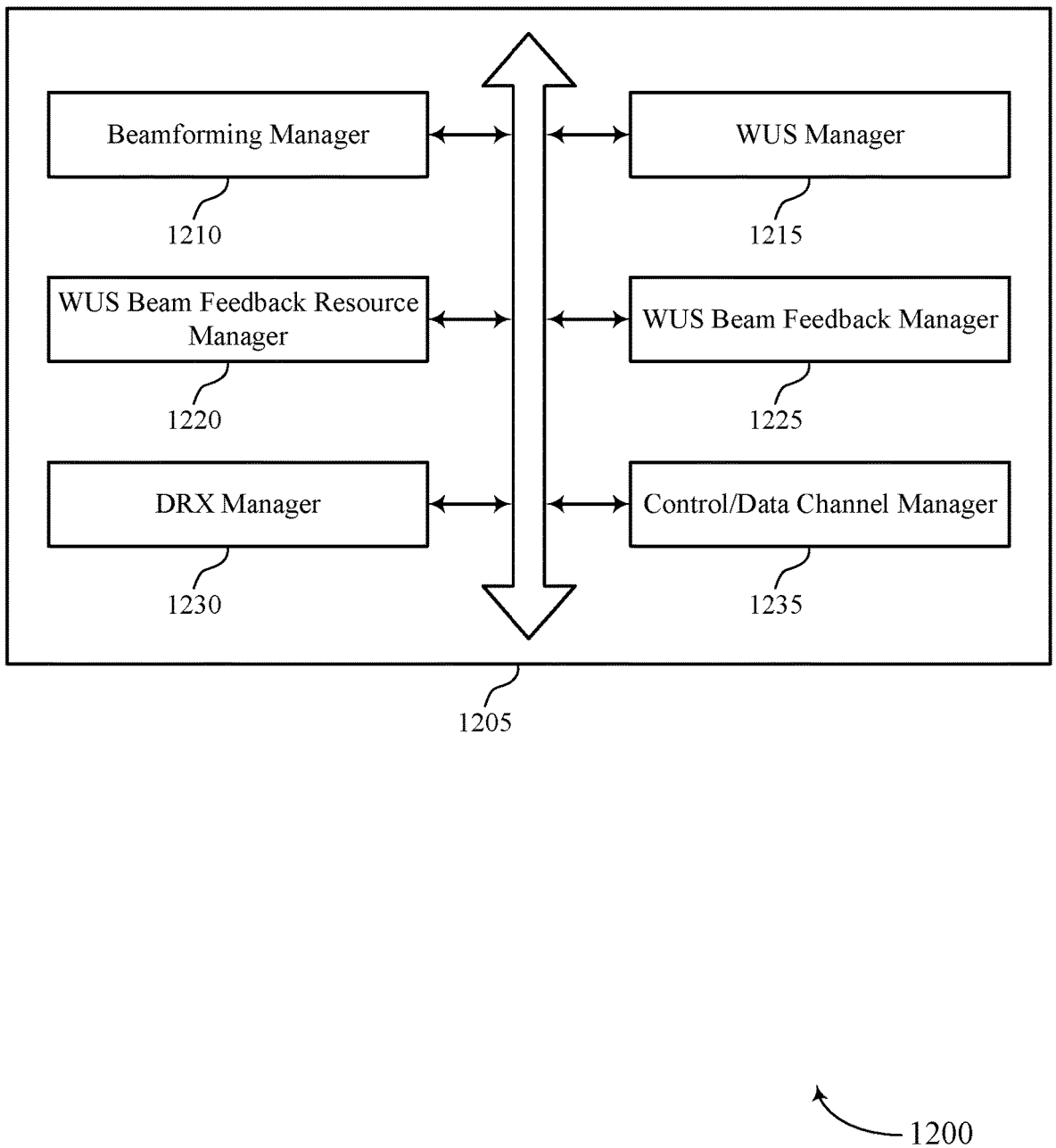
FIG. 12 shows a block diagram of a communications manager that supports DRX wake-up procedures with fast beam management in accordance with aspects of the present disclosure.

FIG. 12 shows a block diagram 1200 of a communications manager 1205 that supports DRX wake-up procedures with fast beam management in accordance with aspects of the present disclosure. The communications manager 1205 may be an example of aspects of a communications manager 1015, a communications manager 1115, or a communications manager 1310 described herein. The communications manager 1205 may include a beamforming manager 1210, a WUS manager 1215, a WUS beam feedback resource manager 1220, a WUS beam feedback manager 1225, a DRX manager 1230, and a control/data channel manager 1235. Each of these modules may communicate, directly or indirectly, with one another (e.g., via one or more buses).

The beamforming manager 1210 may identify a group of UEs associated with a set of transmit beams, the group of UEs operating according to discontinuous reception in a connected mode.

The WUS manager 1215 may transmit a set of wake-up messages during a wake-up signal occasion prior to or within discontinuous reception on-durations associated with the group of UEs, where each wake-up message of the set of wake-up messages is transmitted using a different transmit beam of the set of transmit beams. In some examples, the WUS manager 1215 may set one or more wake-up indication bits in the set of wake-up messages based on the downlink data buffered at the base station for the one or more UEs. In some examples, the WUS manager 1215 may set wake-up indication bits in the set of wake-up messages to indicate no downlink data being present at the base station based on the identifying that none of the group of UEs have downlink data buffered at the base station.

The WUS beam feedback resource manager 1220 may identify uplink resources corresponding to the set of wake-up messages. In some examples, the WUS beam feedback resource manager 1220 may transmit an indication of a correspondence between the set of wake-up messages and the uplink resources. In some cases, a wake-up message of the set of wake-up messages includes an indication of a correspondence between the wake-up message and an uplink resource of the uplink resources. In some cases, the uplink resources include a set of uplink resources, each of the set of uplink resources corresponding to one wake-up message of the set of wake-up messages. In some cases, the uplink resources include a single uplink resource corresponding to the set of wake-up messages.

The WUS beam feedback manager 1225 may receive a beam report from at least one of the group of UEs over the uplink resources based on the transmitted set of wake-up messages. In some examples, the WUS beam feedback manager 1225 may receive an acknowledgement for one or more of the set of wake-up messages over an uplink resource of the uplink resources. In some examples, the WUS beam feedback manager 1225 may receive a received signal power value for one or more of the set of wake-up messages over an uplink resource of the uplink resources. In some examples, the WUS beam feedback manager 1225 may identify, for a first UE of the group of UEs, a first transmit beam based on the received beam report.

The DRX manager 1230 may identify that one or more UEs of the group of UEs have downlink data buffered at the base station. In some examples, the DRX manager 1230 may identify that none of the group of UEs have downlink data buffered at the base station.

The control/data channel manager 1235 may transmit, in the discontinuous reception on-durations, a PDCCH transmission to the one or more UEs based on setting the one or more wake-up indication bits. In some examples, the control/data channel manager 1235 may transmit, in the discontinuous reception on-durations, a PDCCH transmission using the first transmit beam. In some examples, transmitting the PDCCH transmission includes transmitting the PDCCH transmission in a first control resource set associated with the first transmit beam. In some examples, the control/data channel manager 1235 may transmit a physical downlink data channel transmission using the first transmit beam, the physical downlink data channel transmission scheduled by the PDCCH transmission. In some examples, transmitting the PDCCH transmission includes transmitting the PDCCH transmission in a control resource set configured for a second transmit beam.

Figure 13:
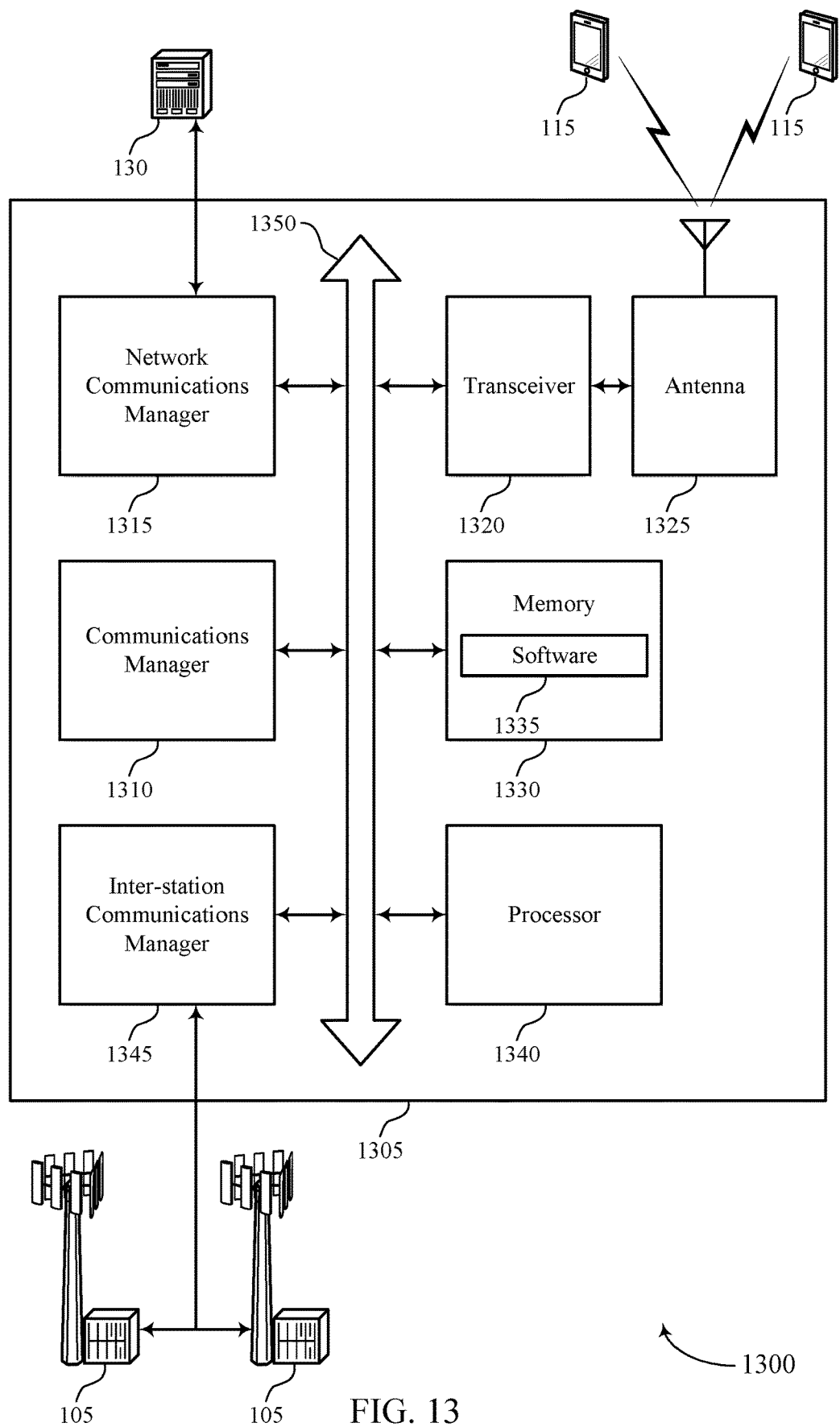
FIG. 13 shows a diagram of a system including a device that supports DRX wake-up procedures with fast beam management in accordance with aspects of the present disclosure.

FIG. 13 shows a diagram of a system 1300 including a device 1305 that supports DRX wake-up procedures with fast beam management in accordance with aspects of the present disclosure. The device 1305 may be an example of or include the components of device 1005, device 1105, or a base station 105 as described herein. The device 1305 may include components for bi-directional voice and data communications including components for transmitting and receiving communications, including a communications manager 1310, a network communications manager 1315, a transceiver 1320, an antenna 1325, memory 1330, a processor 1340, and an inter-station communications manager 1345. These components may be in electronic communication via one or more buses (e.g., bus 1350).

The communications manager 1310 may identify a group of UEs associated with a set of transmit beams, the group of UEs operating according to discontinuous reception in a connected mode, transmit a set of wake-up messages during a wake-up signal occasion prior to or within discontinuous reception on-durations associated with the group of UEs, where each wake-up message of the set of wake-up messages is transmitted using a different transmit beam of the set of transmit beams, identify uplink resources corresponding to the set of wake-up messages, and receive a beam report from at least one of the group of UEs over the uplink resources based on the transmitted set of wake-up messages.

The network communications manager 1315 may manage communications with the core network (e.g., via one or more wired backhaul links). For example, the network communications manager 1315 may manage the transfer of data communications for client devices, such as one or more UEs 115.

The transceiver 1320 may communicate bi-directionally, via one or more antennas, wired, or wireless links as described above. For example, the transceiver 1320 may represent a wireless transceiver and may communicate bi-directionally with another wireless transceiver. The transceiver 1320 may also include a modem to modulate the packets and provide the modulated packets to the antennas for transmission, and to demodulate packets received from the antennas.

In some cases, the wireless device may include a single antenna 1325. However, in some cases the device may have more than one antenna 1325, which may be capable of concurrently transmitting or receiving multiple wireless transmissions.

The memory 1330 may include RAM, ROM, or a combination thereof. The memory 1330 may store computer-readable code or software 1335 including instructions that, when executed by a processor (e.g., the processor 1340) cause the device to perform various functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some cases, a memory controller may be integrated into processor 1340. The processor 1340 may be configured to execute computer-readable instructions stored in a memory (e.g., the memory 1330) to cause the device 1305 to perform various functions (e.g., functions or tasks supporting DRX wake-up procedures with fast beam management).

The inter-station communications manager 1345 may manage communications with other base station 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communication network technology to provide communication between base stations 105.

The software 1335 may include instructions to implement aspects of the present disclosure, including instructions to support wireless communications. The software 1335 may be stored in a non-transitory computer-readable medium such as system memory or other type of memory. In some cases, the software 1335 may not be directly executable by the processor 1340 but may cause a computer (e.g., when compiled and executed) to perform functions described herein.

Figure 14:
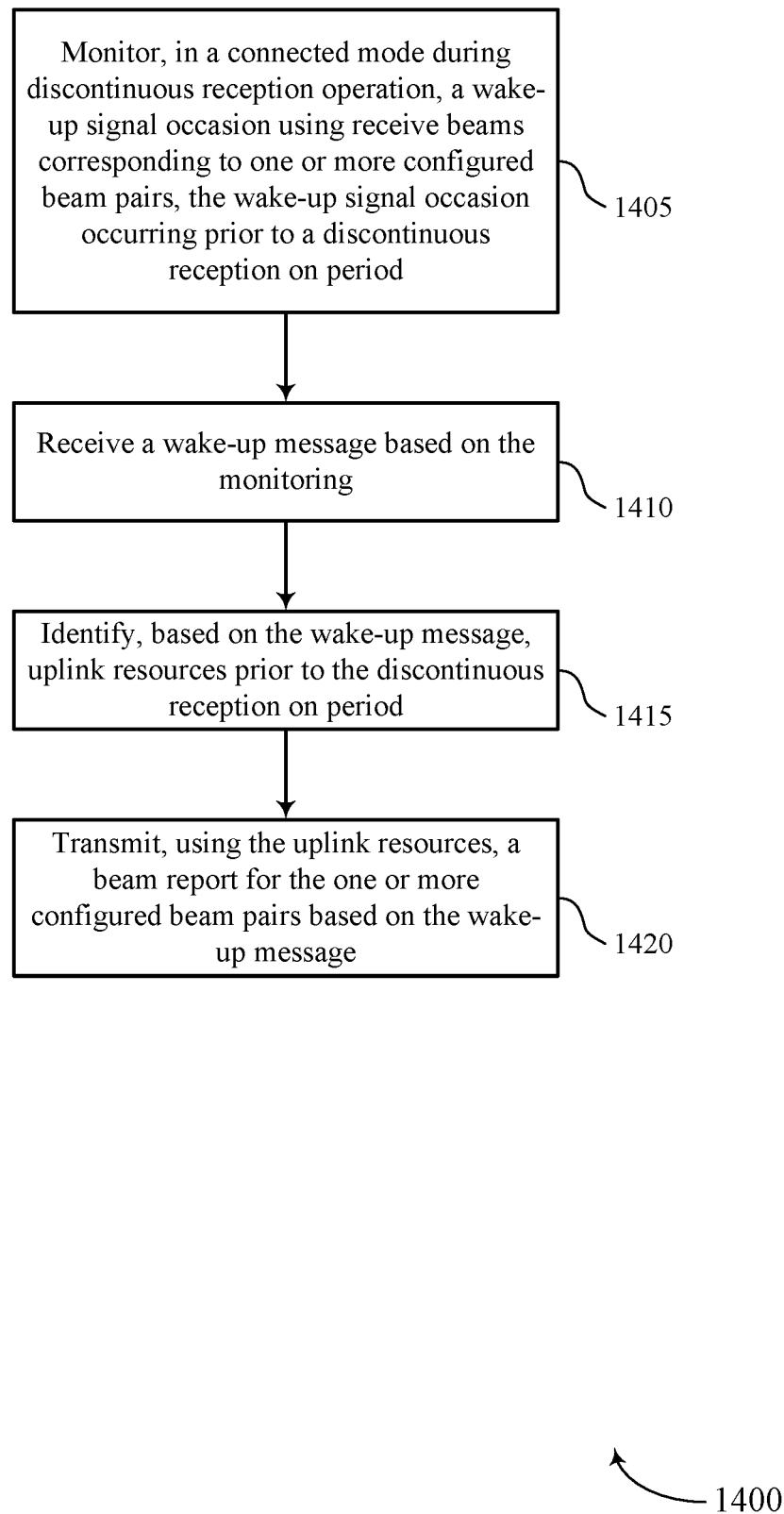
FIGS. 14 through 18 show flowcharts illustrating methods that support DRX wake-up procedures with fast beam management in accordance with aspects of the present disclosure.

FIG. 14 shows a flowchart illustrating a method 1400 that supports DRX wake-up procedures with fast beam management in accordance with aspects of the present disclosure. The operations of method 1400 may be implemented by a UE 115 or its components as described herein. For example, the operations of method 1400 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1405, the UE may monitor, in a connected mode during discontinuous reception operation, a wake-up signal occasion using receive beams corresponding to one or more configured beam pairs, the wake-up signal occasion occurring prior to or within a discontinuous reception on-duration. The operations of 1405 may be performed according to the methods described herein. In some examples, aspects of the operations of 1405 may be performed by a WUS manager as described with reference to FIGS. 6 through 9.

At 1410, the UE may detect a wake-up message based on the monitoring. The operations of 1410 may be performed according to the methods described herein. In some examples, aspects of the operations of 1410 may be performed by a WUS manager as described with reference to FIGS. 6 through 9.

At 1415, the UE may identify, based on the wake-up message, uplink resources prior to or within the discontinuous reception on-duration. The operations of 1415 may be performed according to the methods described herein. In some examples, aspects of the operations of 1415 may be performed by a WUS beam feedback resource manager as described with reference to FIGS. 6 through 9.

At 1420, the UE may transmit, using the uplink resources, a beam report for the one or more configured beam pairs based on the wake-up message. The operations of 1420 may be performed according to the methods described herein. In some examples, aspects of the operations of 1420 may be performed by a WUS beam feedback manager as described with reference to FIGS. 6 through 9.

Figure 15:
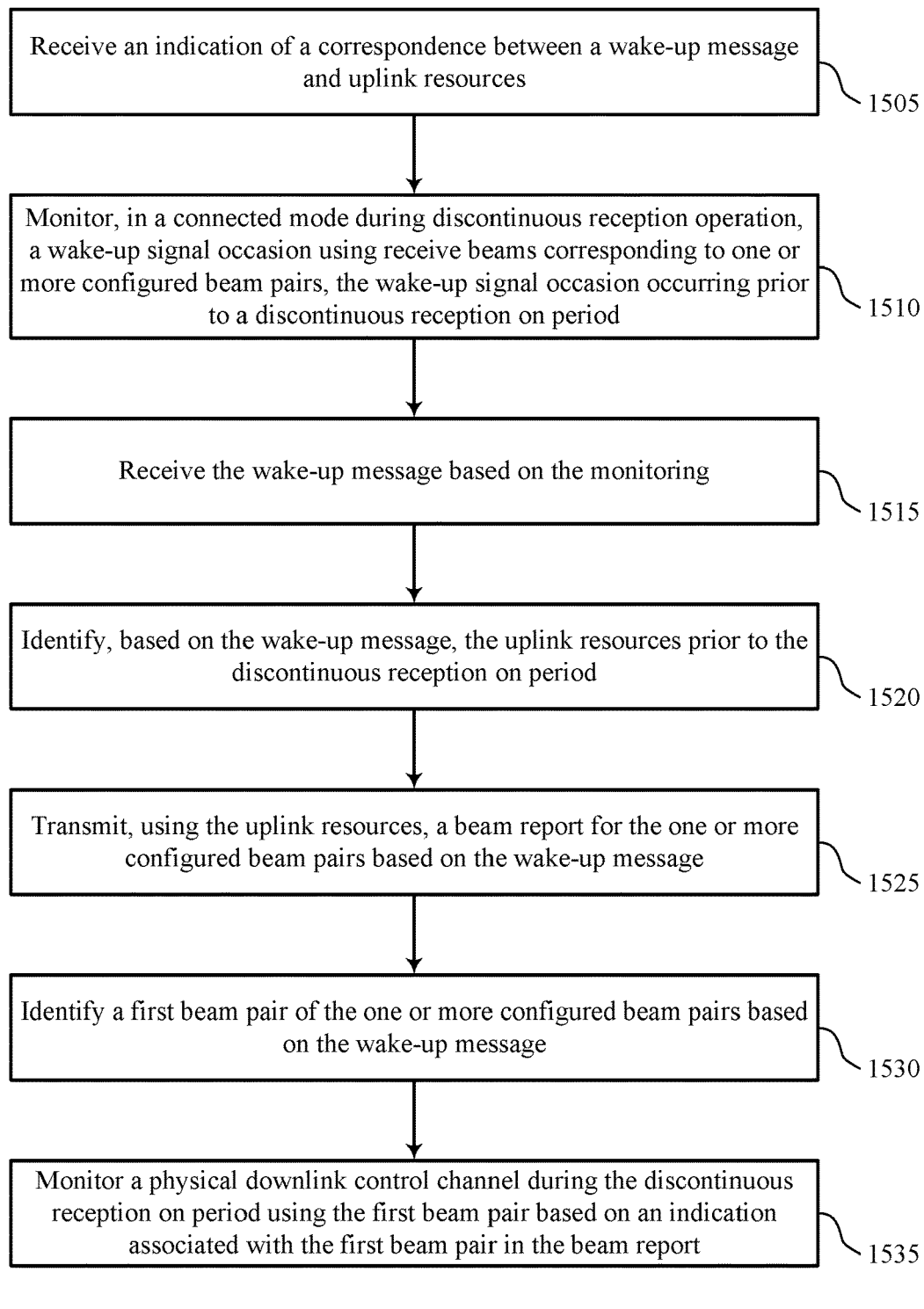

FIG. 15 shows a flowchart illustrating a method 1500 that supports DRX wake-up procedures with fast beam management in accordance with aspects of the present disclosure. The operations of method 1500 may be implemented by a UE 115 or its components as described herein. For example, the operations of method 1500 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1505, the UE may receive an indication of a correspondence between a wake-up message and uplink resources. The operations of 1505 may be performed according to the methods described herein. In some examples, aspects of the operations of 1505 may be performed by a WUS beam feedback resource manager as described with reference to FIGS. 6 through 9.

At 1510, the UE may monitor, in a connected mode during discontinuous reception operation, a wake-up signal occasion using receive beams corresponding to one or more configured beam pairs, the wake-up signal occasion occurring prior to or within a discontinuous reception on-duration. The operations of 1510 may be performed according to the methods described herein. In some examples, aspects of the operations of 1510 may be performed by a WUS manager as described with reference to FIGS. 6 through 9.

At 1515, the UE may receive the wake-up message based on the monitoring. The operations of 1515 may be performed according to the methods described herein. In some examples, aspects of the operations of 1515 may be performed by a WUS manager as described with reference to FIGS. 6 through 9.

At 1520, the UE may identify, based on the wake-up message, the uplink resources prior to or within the discontinuous reception on-duration. For example, the UE may identify the uplink resources based on which beam(s) the wake-up message was received over and the indication of the correspondence between the beam(s) the wake-up message was received over and uplink resources. The operations of 1520 may be performed according to the methods described herein. In some examples, aspects of the operations of 1520 may be performed by a WUS beam feedback resource manager as described with reference to FIGS. 6 through 9.

At 1525, the UE may transmit, using the uplink resources, a beam report for the one or more configured beam pairs based on the wake-up message. The operations of 1525 may be performed according to the methods described herein. In some examples, aspects of the operations of 1525 may be performed by a WUS beam feedback manager as described with reference to FIGS. 6 through 9.

At 1530, the UE may identify a first beam pair of the one or more configured beam pairs based on the wake-up message. The operations of 1530 may be performed according to the methods described herein. In some examples, aspects of the operations of 1530 may be performed by a WUS beam feedback manager as described with reference to FIGS. 6 through 9.

At 1535, the UE may monitor a PDCCH during the discontinuous reception on-duration using the first beam pair based on an indication associated with the first beam pair in the beam report. The operations of 1535 may be performed according to the methods described herein. In some examples, aspects of the operations of 1535 may be performed by a control/data channel manager as described with reference to FIGS. 6 through 9.

Figure 16:
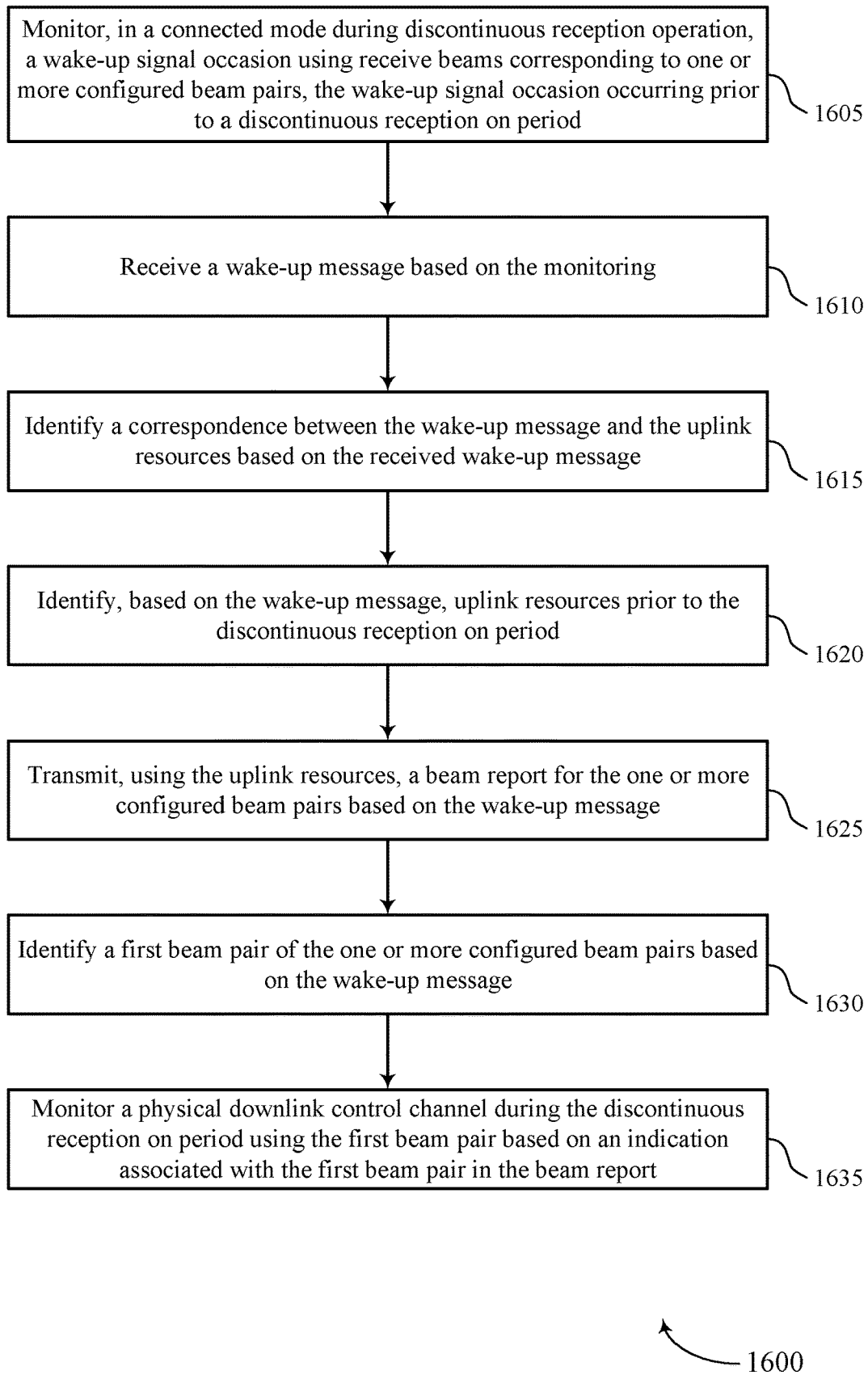

FIG. 16 shows a flowchart illustrating a method 1600 that supports DRX wake-up procedures with fast beam management in accordance with aspects of the present disclosure. The operations of method 1600 may be implemented by a UE 115 or its components as described herein. For example, the operations of method 1600 may be performed by a communications manager as described with reference to FIGS. 6 through 9. In some examples, a UE may execute a set of instructions to control the functional elements of the UE to perform the functions described below. Additionally or alternatively, a UE may perform aspects of the functions described below using special-purpose hardware.

At 1605, the UE may monitor, in a connected mode during discontinuous reception operation, a wake-up signal occasion using receive beams corresponding to one or more configured beam pairs, the wake-up signal occasion occurring prior to or within a discontinuous reception on-duration. The operations of 1605 may be performed according to the methods described herein. In some examples, aspects of the operations of 1605 may be performed by a WUS manager as described with reference to FIGS. 6 through 9.

At 1610, the UE may detect a wake-up message based on the monitoring. The operations of 1610 may be performed according to the methods described herein. In some examples, aspects of the operations of 1610 may be performed by a WUS manager as described with reference to FIGS. 6 through 9.

At 1615, the UE may identify a correspondence between the wake-up message and the uplink resources based on the received wake-up message (e.g., based on a field in the wake-up message including a dynamic indication of uplink resources for beam feedback corresponding to the wake-up message). The operations of 1615 may be performed according to the methods described herein. In some examples, aspects of the operations of 1615 may be performed by a WUS beam feedback resource manager as described with reference to FIGS. 6 through 9.

At 1620, the UE may identify, based on the wake-up message, uplink resources prior to or within the discontinuous reception on-duration. The operations of 1620 may be performed according to the methods described herein. In some examples, aspects of the operations of 1620 may be performed by a WUS beam feedback resource manager as described with reference to FIGS. 6 through 9.

At 1625, the UE may transmit, using the uplink resources, a beam report for the one or more configured beam pairs based on the wake-up message. The operations of 1625 may be performed according to the methods described herein. In some examples, aspects of the operations of 1625 may be performed by a WUS beam feedback manager as described with reference to FIGS. 6 through 9.

At 1630, the UE may identify a first beam pair of the one or more configured beam pairs based on the wake-up message. The operations of 1630 may be performed according to the methods described herein. In some examples, aspects of the operations of 1630 may be performed by a WUS beam feedback manager as described with reference to FIGS. 6 through 9.

At 1635, the UE may monitor a PDCCH during the discontinuous reception on-duration using the first beam pair based on an indication associated with the first beam pair in the beam report. The operations of 1635 may be performed according to the methods described herein. In some examples, aspects of the operations of 1635 may be performed by a control/data channel manager as described with reference to FIGS. 6 through 9.

Figure 17:
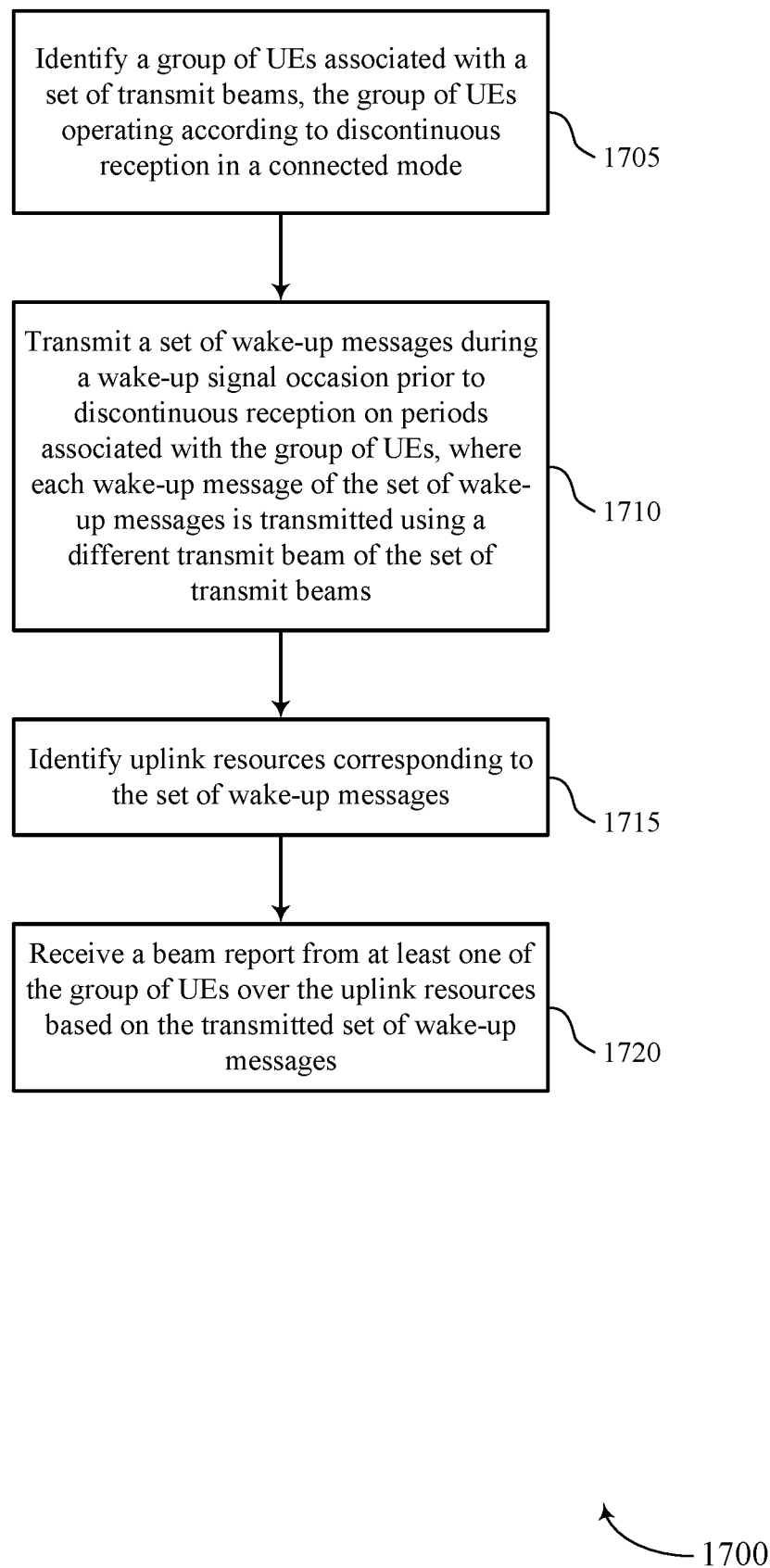

FIG. 17 shows a flowchart illustrating a method 1700 that supports DRX wake-up procedures with fast beam management in accordance with aspects of the present disclosure. The operations of method 1700 may be implemented by a base station 105 or its components as described herein. For example, the operations of method 1700 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1705, the base station may identify a group of UEs associated with a set of transmit beams, the group of UEs operating according to discontinuous reception in a connected mode. The operations of 1705 may be performed according to the methods described herein. In some examples, aspects of the operations of 1705 may be performed by a beamforming manager as described with reference to FIGS. 10 through 13.

At 1710, the base station may transmit a set of wake-up messages during a wake-up signal occasion prior to or within discontinuous reception on-durations associated with the group of UEs, where each wake-up message of the set of wake-up messages is transmitted using a different transmit beam of the set of transmit beams. The operations of 1710 may be performed according to the methods described herein. In some examples, aspects of the operations of 1710 may be performed by a WUS manager as described with reference to FIGS. 10 through 13.

At 1715, the base station may identify uplink resources corresponding to the set of wake-up messages. The operations of 1715 may be performed according to the methods described herein. In some examples, aspects of the operations of 1715 may be performed by a WUS beam feedback resource manager as described with reference to FIGS. 10 through 13.

At 1720, the base station may receive a beam report from at least one of the group of UEs over the uplink resources based on the transmitted set of wake-up messages. The operations of 1720 may be performed according to the methods described herein. In some examples, aspects of the operations of 1720 may be performed by a WUS beam feedback manager as described with reference to FIGS. 10 through 13.

Figure 18:
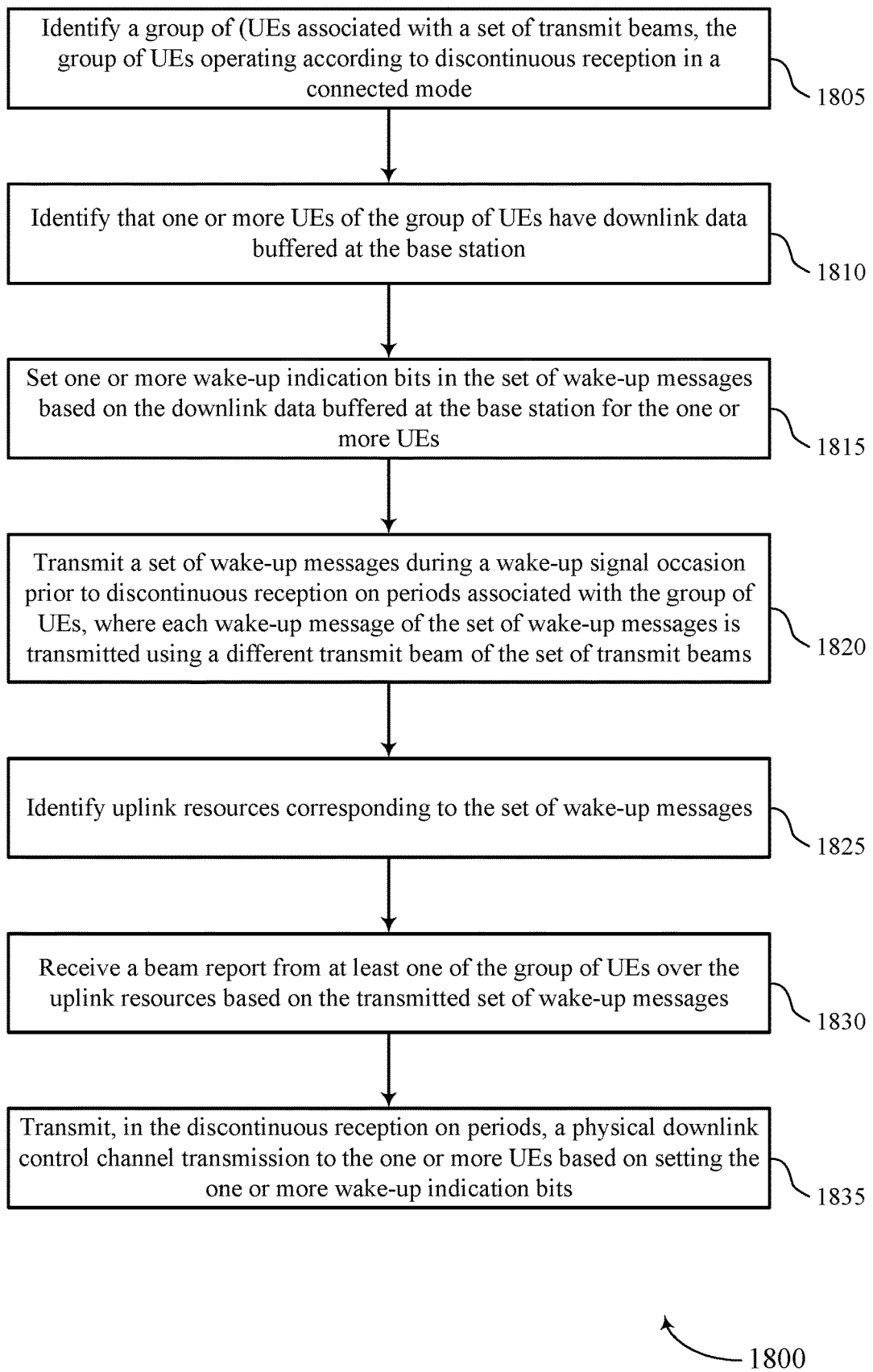

FIG. 18 shows a flowchart illustrating a method 1800 that supports DRX wake-up procedures with fast beam management in accordance with aspects of the present disclosure. The operations of method 1800 may be implemented by a base station 105 or its components as described herein. For example, the operations of method 1800 may be performed by a communications manager as described with reference to FIGS. 10 through 13. In some examples, a base station may execute a set of instructions to control the functional elements of the base station to perform the functions described below. Additionally or alternatively, a base station may perform aspects of the functions described below using special-purpose hardware.

At 1805, the base station may identify a group of UEs associated with a set of transmit beams, the group of UEs operating according to discontinuous reception in a connected mode. The operations of 1805 may be performed according to the methods described herein. In some examples, aspects of the operations of 1805 may be performed by a beamforming manager as described with reference to FIGS. 10 through 13.

At 1810, the base station may identify that one or more UEs of the group of UEs have downlink data buffered at the base station. The operations of 1810 may be performed according to the methods described herein. In some examples, aspects of the operations of 1810 may be performed by a DRX manager as described with reference to FIGS. 10 through 13.

At 1815, the base station may set one or more wake-up indication bits in the set of wake-up messages based on the downlink data buffered at the base station for the one or more UEs. The operations of 1815 may be performed according to the methods described herein. In some examples, aspects of the operations of 1815 may be performed by a WUS manager as described with reference to FIGS. 10 through 13.

At 1820, the base station may transmit a set of wake-up messages during a wake-up signal occasion prior to or within discontinuous reception on-durations associated with the group of UEs, where each wake-up message of the set of wake-up messages is transmitted using a different transmit beam of the set of transmit beams. The operations of 1820 may be performed according to the methods described herein. In some examples, aspects of the operations of 1820 may be performed by a WUS manager as described with reference to FIGS. 10 through 13.

At 1825, the base station may identify uplink resources corresponding to the set of wake-up messages. The operations of 1825 may be performed according to the methods described herein. In some examples, aspects of the operations of 1825 may be performed by a WUS beam feedback resource manager as described with reference to FIGS. 10 through 13.

At 1830, the base station may receive a beam report from at least one of the group of UEs over the uplink resources based on the transmitted set of wake-up messages. The operations of 1830 may be performed according to the methods described herein. In some examples, aspects of the operations of 1830 may be performed by a WUS beam feedback manager as described with reference to FIGS. 10 through 13.

At 1835, the base station may transmit, in the discontinuous reception on-durations, a PDCCH transmission to the one or more UEs based on setting the one or more wake-up indication bits. The operations of 1835 may be performed according to the methods described herein. In some examples, aspects of the operations of 1835 may be performed by a control/data channel manager as described with reference to FIGS. 10 through 13.

Described below are a number of embodiments of methods, systems or apparatuses including means for implementing methods or realizing apparatuses, non-transitory computer-readable medium storing instructions executable by one or more processors to cause the one or more processors to implement methods, and systems including one or more processors and memory coupled with the one or more processors storing instructions executable by the one or more processors to cause the system or apparatus to implement methods. It is to be understood that these are just some examples of possible embodiments, and other examples will be readily apparent to those skilled in the art without departing from the scope of the disclosure.

Example 1: A method for wireless communication at a user equipment (UE), comprising: monitoring, in a connected mode during discontinuous reception operation, a wake-up signal occasion using receive beams corresponding to one or more configured beam pairs, the wake-up signal occasion occurring prior to or within a discontinuous reception on-duration; detecting a wake-up message based at least in part on the monitoring; identifying, based at least in part on the wake-up message, uplink resources prior to or within the discontinuous reception on-duration; and transmitting, using the uplink resources, a beam report for the one or more configured beam pairs based at least in part on the wake-up message.

Example 2: The method of example 1, further comprising receiving an indication of a correspondence between the wake-up message and the uplink resources.

Example 3: The method of examples 1 or 2, further comprising identifying a correspondence between the wake-up message and the uplink resources based at least in part on the received wake-up message.

Example 4: The method of any of examples 1 through 3, wherein transmitting the beam report comprises transmitting an acknowledgement for the received wake-up message using the uplink resources.

Example 5: The method of any of examples 1 through 4, wherein transmitting the beam report comprises transmitting a received signal power value for the received wake-up message using the uplink resources.

Example 6: The method of any of examples 1 through 5, wherein the wake-up message comprises a plurality of wake-up messages and the uplink resources comprises a plurality of uplink resources, each of the plurality of uplink resources corresponding to one wake-up message of the plurality of wake-up messages.

Example 7: The method of any of examples 1 through 6, wherein the wake-up message comprises a plurality of wake-up messages and the uplink resources comprise a single uplink resource corresponding to the plurality of wake-up messages.

Example 8: The method of example 7, wherein transmitting the beam report comprises transmitting an index associated with the received wake-up message.

Example 9: The method of any of examples 1 through 8, further comprising monitoring a physical downlink control channel (PDCCH) during the discontinuous reception on-duration based at least in part on the wake-up message comprising a wake-up indication for the UE; and receiving a downlink control channel transmission based at least in part on the monitoring.

Example 10: The method of any of examples 1 through 9, further comprising identifying a first beam pair of the one or more configured beam pairs based at least in part on the wake-up message; and monitoring a PDCCH during the discontinuous reception on-duration using the first beam pair based at least in part on an indication associated with the first beam pair in the beam report.

Example 11: The method of example 10, further comprising receiving a physical downlink data channel scheduled by the PDCCH using the first beam pair based at least in part on the indication associated with the first beam pair in the beam report.

Example 12: The method of example 10, wherein the monitoring the PDCCH comprises monitoring a first control resource set of a plurality of control resource sets based at least in part on identifying the first beam pair.

Example 13: The method of example 10, wherein the monitoring the PDCCH comprises monitoring a first control resource set configured for a second beam pair according to the first beam pair based at least in part on identifying the first beam pair.

Example 14: The method of any of examples 1 through 13, further comprising determining to remain in a power-saving state during the discontinuous reception on-duration based at least in part on the wake-up message comprising an indication that mobile terminated data is not present for the UE.

Example 15: An apparatus comprising at least one means for performing a method of any of examples 1 through 14.

Example 16: An apparatus for wireless communications comprising: a processor; memory coupled with the processor; and instructions stored in the memory and executable by the processor to cause the apparatus to perform a method of any of examples 1 through 14.

Example 17: A non-transitory computer-readable medium storing code for wireless communications, the code comprising instructions executable by a processor to perform a method of any of examples 1 through 14.

Example 18: A method for wireless communication at a base station, comprising: identifying a group of user equipments (UEs) associated with a set of transmit beams, the group of UEs operating according to discontinuous reception in a connected mode; transmitting a set of wake-up messages during a wake-up signal occasion prior to or within discontinuous reception on-durations associated with the group of UEs, wherein each wake-up message of the set of wake-up messages is transmitted using a different transmit beam of the set of transmit beams; identifying uplink resources corresponding to the set of wake-up messages; and receiving a beam report from at least one of the group of UEs over the uplink resources based at least in part on the transmitted set of wake-up messages.

Example 19: The method of example 18, further comprising transmitting an indication of a correspondence between the set of wake-up messages and the uplink resources.

Example 20: The method of example 18 or 19, wherein a wake-up message of the set of wake-up messages includes an indication of a correspondence between the wake-up message and an uplink resource of the uplink resources.

Example 21: The method of any of examples 18 through 20, wherein receiving the beam report comprises receiving an acknowledgement for one or more of the set of wake-up messages over an uplink resource of the uplink resources.

Example 22: The method of any of examples 18 through 21, wherein receiving the beam report comprises receiving a received signal power value for one or more of the set of wake-up messages over an uplink resource of the uplink resources.

Example 23: The method of any of examples 18 through 22, wherein the uplink resources comprise a plurality of uplink resources, each of the plurality of uplink resources corresponding to one wake-up message of the set of wake-up messages.

Example 24: The method of any of examples 18 through 23, wherein the uplink resources comprise a single uplink resource corresponding to the set of wake-up messages.

Example 25: The method of any of examples 18 through 24, further comprising identifying that one or more UEs of the group of UEs have downlink data buffered at the base station; setting one or more wake-up indication bits in the set of wake-up messages based at least in part on the downlink data buffered at the base station for the one or more UEs; and transmitting, in the discontinuous reception on-durations, a PDCCH transmission to the one or more UEs based at least in part on setting the one or more wake-up indication bits.

Example 26: The method of any of examples 18 through 25, further comprising identifying that none of the group of UEs have downlink data buffered at the base station; and setting wake-up indication bits in the set of wake-up messages to indicate no downlink data being present at the base station based at least in part on the identifying that none of the group of UEs have downlink data buffered at the base station.

Example 27: The method of any of examples 18 through 26, further comprising identifying, for a first UE of the group of UEs, a first transmit beam based at least in part on the received beam report; and transmitting, in the discontinuous reception on-durations, a PDCCH transmission using the first transmit beam.

Example 28: The method of example 27, further comprising transmitting a physical downlink data channel transmission using the first transmit beam, the physical downlink data channel transmission scheduled by the PDCCH transmission.

Example 29: The method of example 27, wherein transmitting the PDCCH transmission comprises transmitting the PDCCH transmission in a first control resource set associated with the first transmit beam.

Example 30: The method of example 27, wherein transmitting the PDCCH transmission comprises transmitting the PDCCH transmission in a control resource set configured for a second transmit beam.

Example 31: An apparatus comprising at least one means for performing a method of any of examples 18 through 30.

Example 32: An apparatus for wireless communications comprising: a processor; memory coupled with the processor; and instructions stored in the memory and executable by the processor to cause the apparatus to perform a method of any of examples 18 through 30.

Example 33: A non-transitory computer-readable medium storing code for wireless communications, the code comprising instructions executable by a processor to perform a method of any of examples 18 through 30.

It should be noted that the methods described herein describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned herein as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs with service subscriptions with the network provider. A small cell may be associated with a lower-powered base station, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA, or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
   monitoring, in a connected mode during discontinuous reception operation, a wake-up signal occasion using receive beams corresponding to one or more configured beam pairs, the wake-up signal occasion occurring prior to or within a discontinuous reception on-duration;
   detecting a wake-up message via a first receive beam corresponding to a first configured beam pair of the one or more configured beam pairs based at least in part on the monitoring;
   selecting, based at least in part on the wake-up message, a first uplink resource from among a set of uplink resources prior to or within the discontinuous reception on-duration, each of the one or more configured beam pairs being associated with a corresponding uplink resource of the set of uplink resources, wherein the first uplink resource is configured for transmitting feedback for the first configured beam pair; and
   transmitting, using the first uplink resource, a beam report for the one or more configured beam pairs based at least in part on detecting the wake-up message, wherein the beam report comprises feedback for the first receive beam.

2. The method of claim 1, further comprising:
   receiving an indication of a correspondence between the wake-up message and at least the first uplink resource from among the set of uplink resources.

3. The method of claim 1, further comprising:
   identifying a correspondence between the wake-up message and at least the first uplink resource from among the set of uplink resources based at least in part on the detected wake-up message.

4. The method of claim 1, wherein transmitting the beam report comprises:
   transmitting an acknowledgement or a received signal power value for the detected wake-up message using the uplink resources.

5. The method of claim 1, wherein the wake-up message comprises a plurality of wake-up messages and the set of uplink resources comprises a plurality of uplink resources, each of the plurality of uplink resources corresponding to one wake-up message of the plurality of wake-up messages.

6. The method of claim 1, wherein the wake-up message comprises a plurality of wake-up messages and the set of uplink resources comprise a single uplink resource corresponding to the plurality of wake-up messages.

7. The method of claim 6, wherein transmitting the beam report comprises:
   transmitting an index associated with the detected wake-up message.

8. The method of claim 1, further comprising:
   monitoring a physical downlink control channel during the discontinuous reception on-duration based at least in part on the wake-up message comprising a wake-up indication for the UE; and
   receiving a downlink control channel transmission based at least in part on the monitoring.

9. The method of claim 1, further comprising:
   identifying the first configured beam pair of the one or more configured beam pairs based at least in part on the wake-up message;
   monitoring a physical downlink control channel during the discontinuous reception on-duration using the first configured beam pair based at least in part on an indication associated with the first configured beam pair in the beam report; and
   receiving a physical downlink data channel scheduled by the physical downlink control channel using the first configured beam pair based at least in part on the indication associated with the first configured beam pair in the beam report.

10. The method of claim 9, wherein the monitoring the physical downlink control channel comprises monitoring a first control resource set of a plurality of control resource sets based at least in part on identifying the first configured beam pair.

11. The method of claim 9, wherein the monitoring the physical downlink control channel comprises monitoring a first control resource set configured for a second configured beam pair according to the first configured beam pair based at least in part on identifying the first beam configured pair.

12. The method of claim 1, further comprising:
   determining to remain in a power-saving state during the discontinuous reception on-duration based at least in part on the wake-up message comprising an indication that mobile terminated data is not present for the UE.

13. A method for wireless communication at a base station, comprising:
   identifying a group of user equipments (UEs) associated with a set of transmit beams corresponding to one or more configured beam pairs, the group of UEs operating according to discontinuous reception in a connected mode;

transmitting a set of wake-up messages during a wake-up signal occasion prior to or within discontinuous reception on-durations associated with the group of UEs, wherein each wake-up message of the set of wake-up messages is transmitted using a different transmit beam of the set of transmit beams;

identifying a set of uplink resources corresponding to the set of wake-up messages, each of the one or more configured beam pairs being associated with a corresponding uplink resource of the set of uplink resources, wherein each uplink resource of the set of uplink resources is configured for receiving feedback for at least one of the one or more configured beam pairs; and receiving a beam report from at least one of the group of UEs over one or more uplink resources of the set of uplink resources based at least in part on the transmitted set of wake-up messages, wherein the beam report comprises feedback for at least one of the one or more configured beam pairs.

14. The method of claim 13, further comprising:
transmitting an indication of a correspondence between the set of wake-up messages and the set of uplink resources.

15. The method of claim 13, wherein a wake-up message of the set of wake-up messages includes an indication of a correspondence between the wake-up message and an uplink resource of the set of uplink resources.

16. The method of claim 13, wherein receiving the beam report comprises:
receiving an acknowledgement or a received signal power value for one or more of the set of wake-up messages over the one or more uplink resources of the set of uplink resources.

17. The method of claim 13, wherein the set of uplink resources comprise a plurality of uplink resources, each of the plurality of uplink resources corresponding to one wake-up message of the set of wake-up messages.

18. The method of claim 13, wherein the set of uplink resources comprise a single uplink resource corresponding to the set of wake-up messages.

19. The method of claim 13, further comprising:
identifying that one or more UEs of the group of UEs have downlink data buffered at the base station;
setting one or more wake-up indication bits in the set of wake-up messages based at least in part on the downlink data buffered at the base station for the one or more UEs; and
transmitting, in the discontinuous reception on-durations, a physical downlink control channel transmission to the one or more UEs based at least in part on setting the one or more wake-up indication bits.

20. The method of claim 13, further comprising:
identifying that none of the group of UEs have downlink data buffered at the base station; and
setting wake-up indication bits in the set of wake-up messages to indicate no downlink data being present at the base station based at least in part on the identifying that none of the group of UEs have downlink data buffered at the base station.

21. The method of claim 13, further comprising:
identifying, for a first UE of the group of UEs, a first transmit beam corresponding to a first configured beam pair of the one or more configured beam pairs based at least in part on the received beam report; and transmitting, in the discontinuous reception on-durations, a physical downlink control channel transmission using the first transmit beam; and transmitting a physical downlink data channel transmission using the first transmit beam, the physical downlink data channel transmission scheduled by the physical downlink control channel transmission.

22. The method of claim 21, wherein:
transmitting the physical downlink control channel transmission comprises transmitting the physical downlink control channel transmission in a first control resource set associated with the first transmit beam.

23. The method of claim 21, wherein:
transmitting the physical downlink control channel transmission comprises transmitting the physical downlink control channel transmission in a control resource set configured for a second transmit beam corresponding to a second configured beam pair of the one or more configured beam pairs.

24. An apparatus for wireless communication at a user equipment (UE), comprising: a processor, memory coupled with the processor; and instructions stored in the memory and executable by the processor to cause the apparatus to:
monitor, in a connected mode during discontinuous reception operation, a wake-up signal occasion using receive beams corresponding to one or more configured beam pairs, the wake-up signal occasion occurring prior to or within a discontinuous reception on-duration;
detect a wake-up message via a first receive beam corresponding to a first configured beam pair of the one or more configured beam pairs based at least in part on the monitoring;
select, based at least in part on the wake-up message, a first uplink resource from among a set of uplink resources prior to or within the discontinuous reception on-duration, each of the one or more configured beam pairs being associated with a corresponding uplink resource of the set of uplink resources, wherein the first uplink resource is configured for transmitting feedback for the first configured beam pair; and
transmit, using the first uplink resource, a beam report for the one or more configured beam pairs based at least in part on detecting the wake-up message, wherein the beam report comprises feedback for the first receive beam.

25. The apparatus of claim 24, wherein the instructions are further executable by the processor to cause the apparatus to:
receive an indication of a correspondence between the wake-up message and at least the first uplink resource from among the set of uplink resources.

26. The apparatus of claim 24, wherein the instructions are further executable by the processor to cause the apparatus to:
identify a correspondence between the wake-up message and at least the first uplink resource from among the set of uplink resources based at least in part on the detected wake-up message.

27. The apparatus of claim 24, wherein the instructions to transmit the beam report are executable by the processor to cause the apparatus to:
transmit an acknowledgement for the detected wake-up message using the uplink resources.

28. An apparatus for wireless communication at a base station, comprising: a processor, memory coupled with the processor; and instructions stored in the memory and executable by the processor to cause the apparatus to:

identify a group of user equipments (UEs) associated with a set of transmit beams corresponding to one or more configured beam pairs, the group of UEs operating according to discontinuous reception in a connected mode;

transmit a set of wake-up messages during a wake-up signal occasion prior to or within discontinuous reception on-durations associated with the group of UEs, wherein each wake-up message of the set of wake-up messages is transmitted using a different transmit beam of the set of transmit beams;

identify a set of uplink resources corresponding to the set of wake-up messages, each of the one or more configured beam pairs being associated with a corresponding uplink resource of the set of uplink resources, wherein each uplink resource of the set of uplink resources is configured for receiving feedback for at least one of the one or more configured beam pairs; and receive a beam report from at least one of the group of UEs over one or more uplink resources of the set of uplink resources based at least in part on the transmitted set of wake-up messages, wherein the beam report comprises feedback for at least one of the one or more configured beam pairs.

29. The apparatus of claim 28, wherein the instructions are further executable by the processor to cause the apparatus to:

transmit an indication of a correspondence between the set of wake-up messages and the set of uplink resources.

30. The apparatus of claim 28, wherein a wake-up message of the set of wake-up messages includes an indication of a correspondence between the wake-up message and an uplink resource of the set of uplink resources.

* * * * *